United States Patent [19]

Yamagishi

[11] Patent Number: 5,838,926
[45] Date of Patent: Nov. 17, 1998

[54] DATA PROCESSING APPARATUS AND METHOD IN A NETWORK SYSTEM FOR CONNECTING A PLURALITY OF TERMINALS

[75] Inventor: Yoichi Yamagishi, Tokyo, Japan

[73] Assignee: Canon Kabushiki Kaisha, Tokyo, Japan

[21] Appl. No.: 814,194

[22] Filed: Mar. 10, 1997

[30] Foreign Application Priority Data

Mar. 13, 1996 [JP] Japan ................................. 8-083084

[51] Int. Cl.$^6$ ....................................................... G06F 15/16
[52] U.S. Cl. ............................... 395/200.79; 395/200.48; 395/200.31
[58] Field of Search ......................... 395/200.47, 200.48, 395/200.31, 200.79

[56] References Cited

U.S. PATENT DOCUMENTS

| | | | |
|---|---|---|---|
| 5,440,558 | 8/1995 | Ban | 370/463 |
| 5,450,582 | 9/1995 | Nakajima et al. | 707/10 |
| 5,533,174 | 7/1996 | Flowers, Jr. et al. | 395/114 |
| 5,619,555 | 4/1997 | Fenton et al. | 379/67 |
| 5,657,375 | 8/1997 | Connolly et al. | 455/436 |

*Primary Examiner*—Krisna Lim
*Attorney, Agent, or Firm*—Morgan & Finnegan LLP

[57] ABSTRACT

A data process apparatus in a network system capable of connecting a plurality of terminals judges a setting position of the data process apparatus within the network system, requests a data process, displays information representing the terminal within the network system which terminal should perform the data process requested on the basis of the setting position, and indicates the terminal corresponding to the information displayed on the display unit to perform the data process. Accordingly, on the display of a computer or an image formation apparatus on a side which requests the data process, the computer or the image formation apparatus which is close positioned can be detected, displayed and selected from among the computers or the image formation apparatuses on a side to which the process is requested.

17 Claims, 20 Drawing Sheets

FIG. 10

| NO. | NAME | FIRST PRIORITY ZONE | SECOND PRIORITY ZONE | THIRD PRIORITY ZONE |
|---|---|---|---|---|
| 132 | MFP1 | B | A | C |
| 134 | MFP2 | B | C | A |
| 144 | PC1 | B | A | C |
| 146 | PC2 | B | C | A |
| 130 | MFP3 | A | B | — |
| 140 | PC3 | A | B | — |
| 142 | PC4 | A | B | — |
| 136 | MFP5 | C | B | — |
| 148 | PC5 | C | B | — |

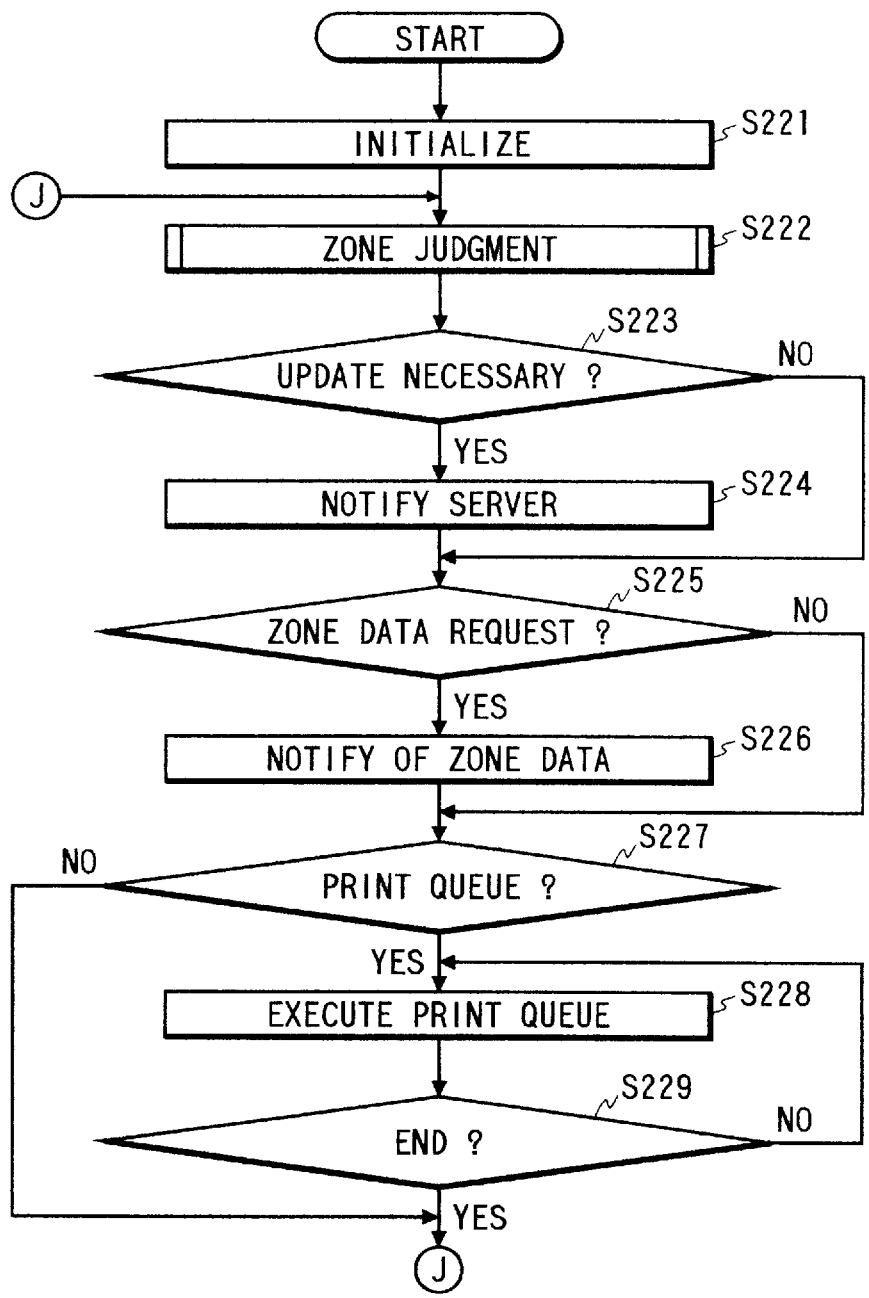

FIG. 17A

| NO. | NAME | FIRST PRIORITY ZONE | SECOND PRIORITY ZONE | THIRD PRIORITY ZONE |
|---|---|---|---|---|
| 132 | MFP1 | B | A | C |
| 134 | MFP2 | B | C | A |
| 144 | PC1 | B | A | C |
| 146 | PC2 | B | C | A |

FIG. 17B

| NO. | NAME | FIRST PRIORITY ZONE | SECOND PRIORITY ZONE | THIRD PRIORITY ZONE |
|---|---|---|---|---|
| 130 | MFP3 | A | B | — |
| 140 | PC3 | A | B | — |
| 142 | PC4 | A | B | — |

FIG. 17C

| NO. | NAME | FIRST PRIORITY ZONE | SECOND PRIORITY ZONE | THIRD PRIORITY ZONE |
|---|---|---|---|---|
| 136 | MFP5 | C | B | — |
| 148 | PC5 | C | B | — |

DATA PROCESSING APPARATUS AND METHOD IN A NETWORK SYSTEM FOR CONNECTING A PLURALITY OF TERMINALS

BACKGROUND OF THE INVENTION

1. Field of the Invention

The present invention relates to data process apparatus and method and an image process system control method in a data process system which processes data such as image data and the like by utilizing equipments such as an image formation apparatus, a computer and the like connected to a communication network.

2. Related Background Art

Conventionally, there has been widely used an image process system which has a function for receiving image and character data from a computer to form an image by using an image formation apparatus, or a function for reading an original image by using the image formation apparatus and sending the image and character data from the image formation apparatus to the computer.

The above-described computer and the image formation apparatus are connected to a network (local area network: LAN) together with other devices. On this network, an individual user can utilize the image process system which is composed of the above-described computers and the image formation apparatuses, as resources allowed by a manager. Such the network (LAN) is generally structured in each predetermined-unit block, e.g., each floor, each building or each branch office, owing to restrictions concerning the number of connectable nodes and a length of a connectable cable. These LANs are connected to others via a public line, whereby these LANs can be utilized also as a WAN (wide area network). Therefore, e.g., an electronic mail can be transmitted and a document can be delivered among the plurality of branch offices.

In such the conventional image process system, a large number of the computers and the image formation apparatuses have been connected to the network. Therefore, e.g., when an operator at one computer intended to perform print output of the image by using either one of the image formation apparatuses, he could not find which is the closest one among the plurality of image formation apparatuses connected to the network. For this reason, there has been inconvenient that, if he performs the print output under a condition that he does not know correspondence between a name of the image formation apparatus on the network and the actual image formation apparatus, he can not perform the print output of the image by using the closest image formation apparatus, or he can not obtain the printed image because such the print output of the image was performed by the image formation apparatus which was not at all intended by the operator to do so. In addition, there has been a problem in security because it is feared that the important printed image is lost.

Accordingly, in order to solve such the problem, there can be supposed a method that all the image formation apparatuses connected to the network are respectively added with simple names which suggest positions of the respective apparatuses. However, in such the method, the manager must change setting values every time a layout of the system or an organization using such the system is changed, whereby there has been a problem that a management cost increases. In addition, since the computer or the image formation apparatus has been made compact in size and thus portability thereof has been improved in recent years, in a case where such the portable computer or the movable image formation apparatus are connected to a wireless (or radio) network to be used, the position on which such the computer or the apparatus is used is frequently changed. For this reason, there has been meaningless that the name for suggesting the position is added to such the computer or the apparatus.

SUMMARY OF THE INVENTION

An object of the present invention is to provide image process apparatus and method which eliminate the above-described problems.

An another object of the present invention is to provide the image process apparatus and method which allows a user in a network system composed of the plurality of apparatuses to select the optimal apparatus.

Still another object of the present invention is to provide the data process apparatus and method which can understand or grasp, in real time, positions of the plurality of apparatuses in the network system.

Still another object of the present invention is to provide the data process apparatus and method which can surely find or search out the apparatus to be used, in the network system.

Still another object of the present invention is to provide the data process apparatus and method which can easily find or search out the apparatus having a function necessary for performing a data process.

The above and other objects of the present invention will become apparent from the following detailed description when read in conjunction with the accompanying drawings.

BRIEF DESCRIPTION OF THE DRAWINGS

FIG. 10 is a view for explaining contents of zone data;

FIG. 16 is a flow chart showing a main routine of an image formation apparatus according to the third embodiment;

FIGS. 17A, 17B and 17C are views showing an example of zone data within the same zone;

DETAILED DESCRIPTION OF THE PREFERRED EMBODIMENTS

Hereinafter, embodiments of the present invention will be explained in detail with reference to accompanying drawings.
(First Embodiment)

Figure 1:
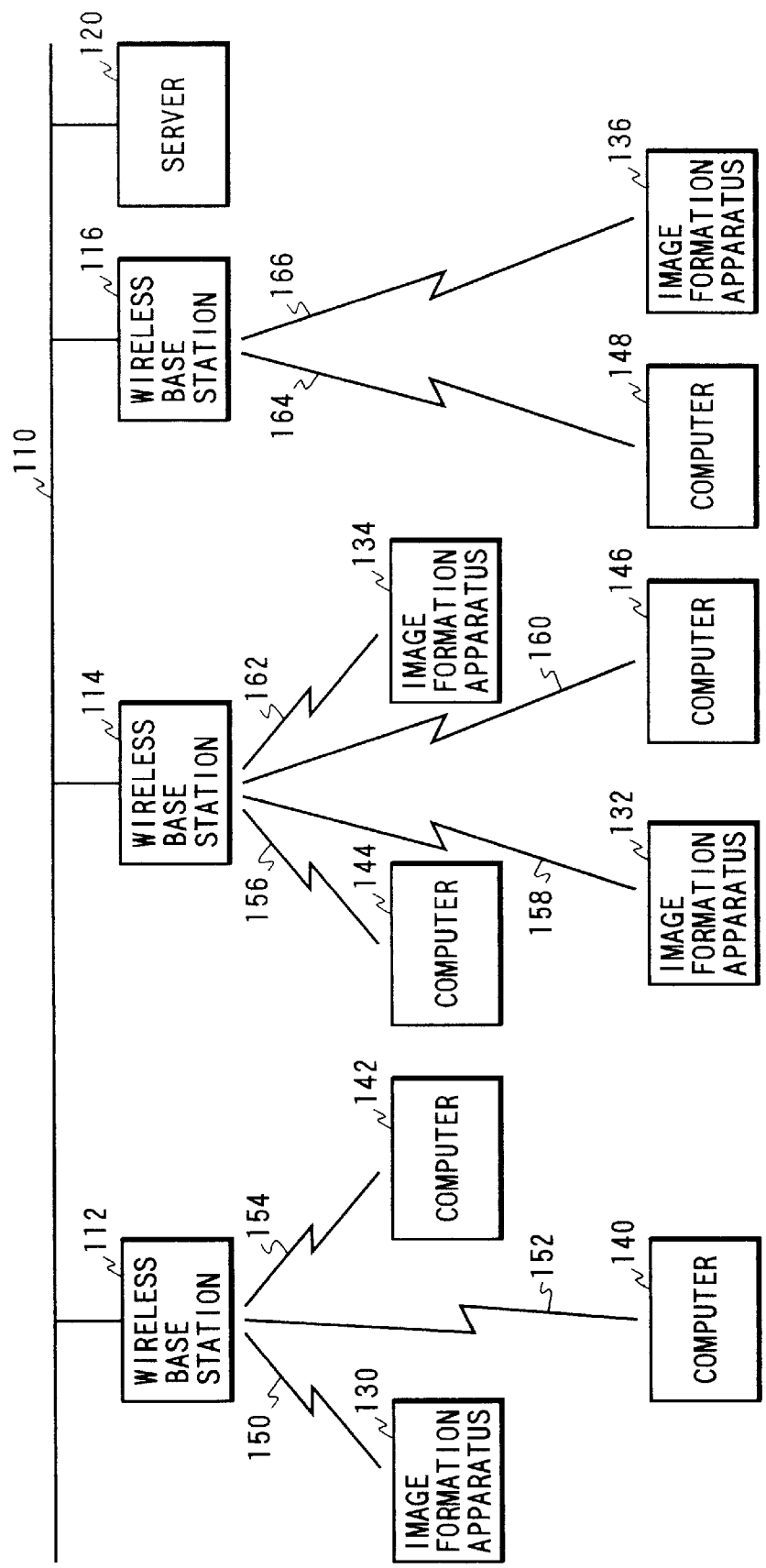
FIG. 1 is a schematic view showing entire structure of an image process system according to a first embodiment of the present invention.

FIG. 1 is a schematic view showing entire structure of an image process system according to the first embodiment of the present invention.

In the drawing, reference numeral 110 denotes a network (local area network: LAN) which is connected to wireless (or radio) base stations 112, 114 and 116 and a server 120. The LAN 110 can be further connected to an another wire or wireless network and a public line via a gate way, to structure a more-larger network. Each of the wireless base stations 112, 114 and 116 which is used for the wireless network transmits and receives a data packet, in wireless (or radio) communication, between a single or a plurality of computers and a single or a plurality of image process apparatuses positioned within respective cognizant or jurisdiction zones, by using a radio wave such as a high-frequency wave, a light such as an infrared ray, an acoustic wave such as a supersonic wave, or the like.

The management server 120 manages or controls equipments which are connected to the network 110 and data of users utilizing these equipments. Further, the server 120 manages use of the equipment by the individual user on the basis of setting of authorization or allowance for the user's equipment, a user's schedule and the like. Reference numerals 130, 132, 134 and 136 respectively denote image formation apparatuses each of which has a display console unit such as a liquid crystal touch panel or the like and is connected to the LAN 110. Further, each image formation apparatus has both a scanner function and a printer function. In this case, the scanner function is to read an original image and output the read image to the another apparatus, and the printer function is to print image data input from the another apparatus. The image formation apparatus itself has a local copy function. In addition, by connecting an optomagnetic disk unit or the like to the image formation apparatus, such the apparatus also can have a function as an electronic filing apparatus for generating or producing electronic data from the image and holding it as a file.

Moreover, such the image formation apparatus has a printer function for visibly outputting data generated by a computer or the like, and thus converts a document or the like generated by each of computers 140, 142, 144, 146, 148 and the like into image formation command data. Then, the obtained command data is sent or transferred to each or all of the image formation apparatuses, via wireless (or radio) networks 152, 154, 156, 160, 164 and the like, the wireless base stations 112, 114 and 116, the LAN 110, and wireless (or radio) networks 150, 158, 162, 166 and the like. The image formation apparatus to which the image formation command data has been transferred develops the image formation command data to bit-map image data and then prints the image data on a recording paper (or sheet).

The computers 140, 142, 144, 146 and 148 form the documents, and exchanges (i.e., transmits and receives) an electronic mail with the another computers connected to the network 110 in an already-known method. Further, the wireless networks 150, 152, 154, 156, 158, 160, 162, 164 and 166 are used in the case where the data packet is transmitted and received between each wireless base station and each computer or each image formation apparats positioned in the respective cognizant zones, by using the radio wave such as the high-frequency wave, the light such as the infrared ray, the acoustic wave such as the supersonic wave, or the like.

Figure 2:
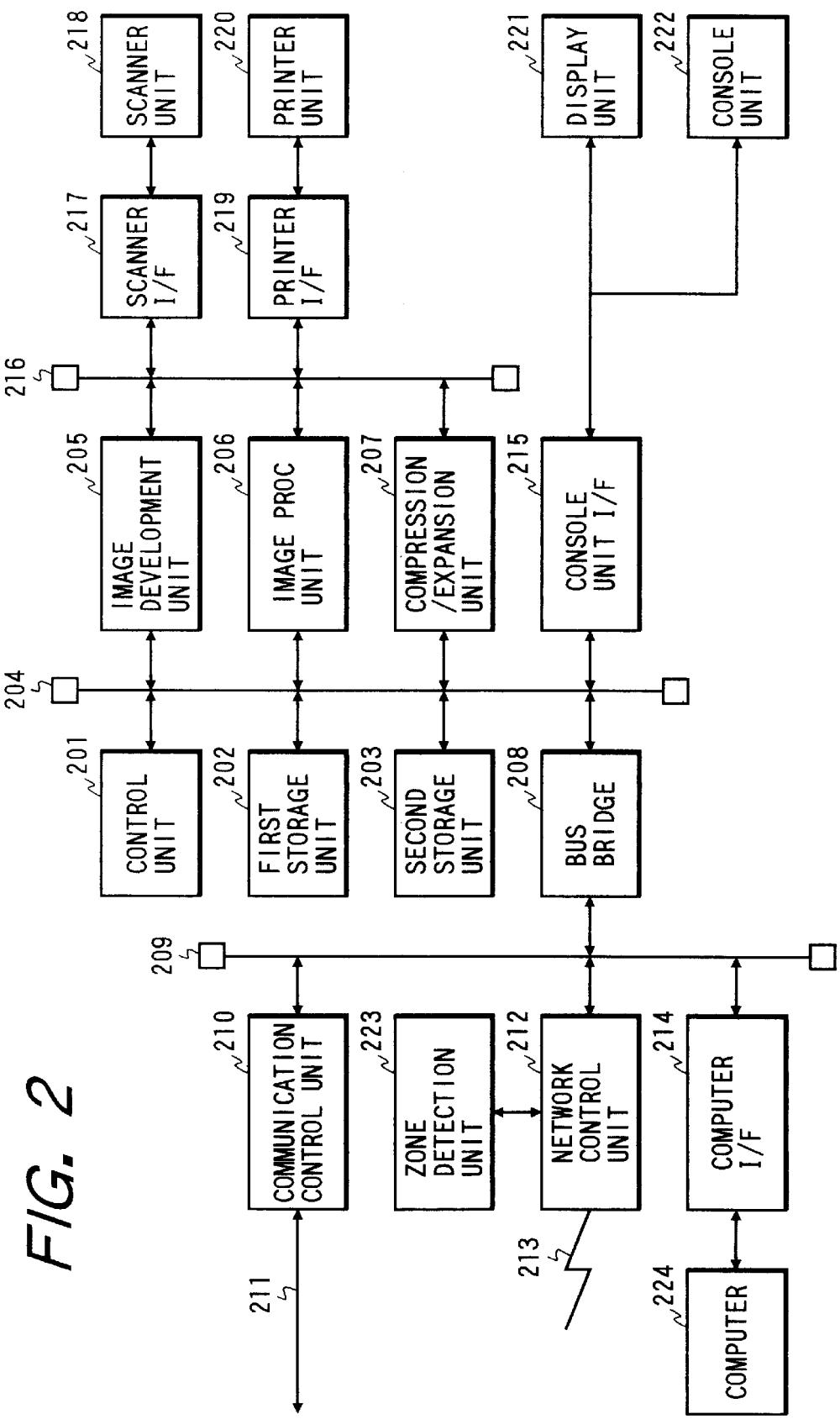
FIG. 2 is a block diagram showing structure of an image formation apparatus shown in FIG. 1.

Subsequently, the structure of the above-described image formation apparatus 130 and the like will be explained hereinafter with reference to FIG. 2.

A control unit 201 is a microprocessor which controls the image formation apparatus as a whole, and is operated based on a real-time OS (operating system). A first storage unit 202 is a working memory which is used when the control unit 201 operates, and can be accessed from the control unit 201 at high speed. Further, a second storage unit 203 is a large-capacity hard disk which stores a plurality of application programs (including programs for executing processes of flow charts shown in FIGS. 9 and 6 described later) which are used when the control unit 201 operates, and is controlled or managed by the control unit 201.

A high-speed CPU bus 204 is a bus to which the above-described control unit 201, the first storage unit 202, the second storage unit 203 and later-described functional units are connected. The bus 204 is used to transfer data processed by the control unit 201 to the respective functional units or to transfer data between the functional units at high speed (i.e., DMA (direct memory access) transfer). Generally, a VL (VESA local) bus or a PCI (peripheral computer interconnect) bus can be used as the high-speed CPU bus 204.

An image development unit (to be referred as an RIP (raster image processor) hereinafter) 205 is a functional unit which receives the image formation command input by an external interface connected to a later-described computer and then converts it into the bit-map image data, in accordance with contents of the image formation command. The image formation command is input from the high-speed CPU bus 204 and used to output the image to a high-speed image bus 216 described later. Generally, a post script unit, a PCL, an LIPS (LBP image processing system), a CaPSL (Canon printing system language) or the like can be interpreted by the RIP.

An image process unit 206 is a functional unit which performs filtering processes, e.g., a smoothing process, an edge process and the like, on the bit-map image data which has been input from the high-speed image bus 216, in accordance with an instruction by the control unit 201. In addition, the image process unit 206 has an OCR (optical character recognition) function and an image separation function for separating a character portion from an image portion on an image input from the high-speed image bus 216. A compression/expansion unit 207 compresses the bit-map image data input from the high-speed image bus 216, in an image compression method such as an MH (modified Huffman) method, an MR (modified READ) method, an MMR (modified modified READ) method, a JPEG (joint photograph expert group) method or the like, and then transfers the compressed data to the high-speed CPU bus 204 or again to the high-speed image bus 216. On the contrary, the compression/expansion unit 207 expands the compressed data input from the bus 204 or 216 in accordance with the compression method used in compression by this functional unit and then transfers the expanded data to the high-speed image bus 216.

A bus bridge 208 is a bus bridge controller which connects the high-speed CPU bus 204 to a later-described low-speed CPU bus 209 to absorb a difference in processing speed between these buses. By providing the bus bridge 208 between these buses, the control unit 201 which operates at high speed can access functional units which are connected to the low-speed CPU bus 209 and operate at low speed. The low-speed CPU bus 209 has the bus structure in which transfer speed thereof is lower than that of the high-speed CPU bus 204, and is connected with the functional units of which processing ability (i.e., processing speed) are relatively low. Generally, an ISA (industrial standard architecture) bus or the like can be used as the low-speed CPU bus 209.

A communication control unit 210 is a functional unit to which a public line 211 and the low-speed CPU bus 209 are connected. In a case where the public line 211 is an analog line, the communication control unit 210 has a function for modifying digital data transferred from the low-speed CPU bus 209 such that the transferred digital data can be transmitted to the public line 211, and has a modem function for converting data which has been transmitted from the public line 211 and modified, into the digital data which can be processed in the image formation apparatus. On the other hand, in a case where the public line 211 is a digital line such as an ISDN (integrated services digital network) or the like, the communication control unit 210 has a terminal adapter function for converting the data transferred from the low-speed CPU bus 209 into data of a predetermined data format according to the digital line, and inversely converting data transmitted from the digital line in the predetermined format into the data which can be processed in the image formation apparatus.

The public line 211 is the analog or digital public line such as a wire telephone line, a wireless telephone line, the ISDN or the like. The network control unit 212 which is a functional unit for connecting the image formation apparatus to the network is used to transmit and receive the data with the network. Generally, an Ethernet, a token ring network or the like can be used as the network to be connected. Further, in case of transmitting and receiving the data with a wireless network, the public line 211 has a modulation and demodulation function according to a modulation wave such as the radio wave (e.g., high-frequency wave), the light (e.g., infrared ray), the acoustic wave (e.g., supersonic wave) or the like.

Reference numeral 213 denotes a wireless network in which the data packet is transmitted and received between the network control unit 212 and the wireless base station by using, e.g., the radio wave such as the high-frequency wave or the like, the light such as the infrared ray or the like, the acoustic wave such as the supersonic wave or the like. A computer interface 214 is a functional unit for connecting the image formation apparatus and a computer 224 with each other. A control command is transferred from the computer 224 to the image formation apparatus and a status is returned from the image formation apparatus to the computer 224, via the computer interface 214. Generally, an RS-232C for performing serial communication, a Centronics interface for performing parallel communication, an SCSI (small computer system interface), an IEEE (Institute of Electrical and Electronic Engineers) 1394 interface, a Fibre-Channel interface, an SSA (serial storage architecture) interface or the like can be used as the interface 214.

A console unit interface 215 is a unit which transfers and receives various control signals with a display unit 221 and a console unit 222 (later described) in the image formation apparatus. That is, the console unit interface 215 transfers a signal from an input switch such as a key or the like provided on the console unit 222 to the control unit 201, and performs resolution conversion on the image data generated by the image development unit 205, the image process unit 206 or the compression/expansion unit 207 such that the converted data is displayed on a liquid crystal display unit provided in the display unit 221.

The high-speed image bus 216 is the bus which connects image data input/output buses in various image formation units (i.e., image development unit 205, image process unit 206 and compression/expansion unit 207) to a scanner interface 217 and a printer interface 219 (both described later). A scanner unit 218 is a visible image reader unit which has an automatic original feeder unit. Further, the scanner unit 218 has an RGB three-line CCD color sensor or a single-line black/white CCD line sensor. Image data which has been read by the scanner unit 218 is transferred to the high-speed image bus 216 via the scanner interface 217.

The scanner interface 217 has a function in which the image data read by the scanner unit 218 is subjected to optimal binarization according to contents of the subsequent processes and then the binarized data is subjected to serial-to-parallel conversion according to a data width of the high-speed image bus 216, or read RGB three-primary color data is converted into CMYBk data.

A printer unit 220 prints the image data received from the printer interface 219 (described later) on the recording paper (or sheet) as visible image data. A bubble-jet printer which performs the print on the recording paper in a bubble-jet method, or a laser beam printer which utilizes an electro-photographic technology to form the image on a photosensitive drum with the laser beam and then to form the image on the recording paper can be used as the printer unit 220. Further, the laser beam printer includes a single-color laser beam printer and a CMYBk color laser beam printer.

The print interface 219 transfers the image data from the high-speed image bus 216 to the printer unit 220. Further, the printer interface 219 has a buswidth conversion function for converting a bus width of the high-speed image bus 216 into a bus width matched with gradation of the printer which is intended to perform the print output, and has a function for absorbing a difference between printing speed of the print unit 220 and transferred speed of the image data in the high-speed image bus 216.

The display unit 221 and the console unit 222 have the liquid crystal display unit, a touch-panel input unit attached to an upper portion of the liquid crystal display unit, and a plurality of hard keys. A signal which has been input by the touch-panel input unit or the hard keys is transferred to the control unit 201 via the above-described console unit interface 215, and then the liquid crystal display unit displays the image data transferred from the console unit interface 215. The functions in the operation by the image formation apparatus, the image data and the like are displayed on the liquid crystal display unit.

Reference numeral 223 denotes a zone detection unit which receives a zone signal transmitted from each wireless base station via the network control unit 212. In each zone signal, e.g., a frequency, a phase, an amplitude and/or an identification code are included respectively in different formats. When intensity of the zone signal is detected by the zone detection unit 223, there can be known that the image formation apparatus is positioned in which cognizant zone.

Figure 3:
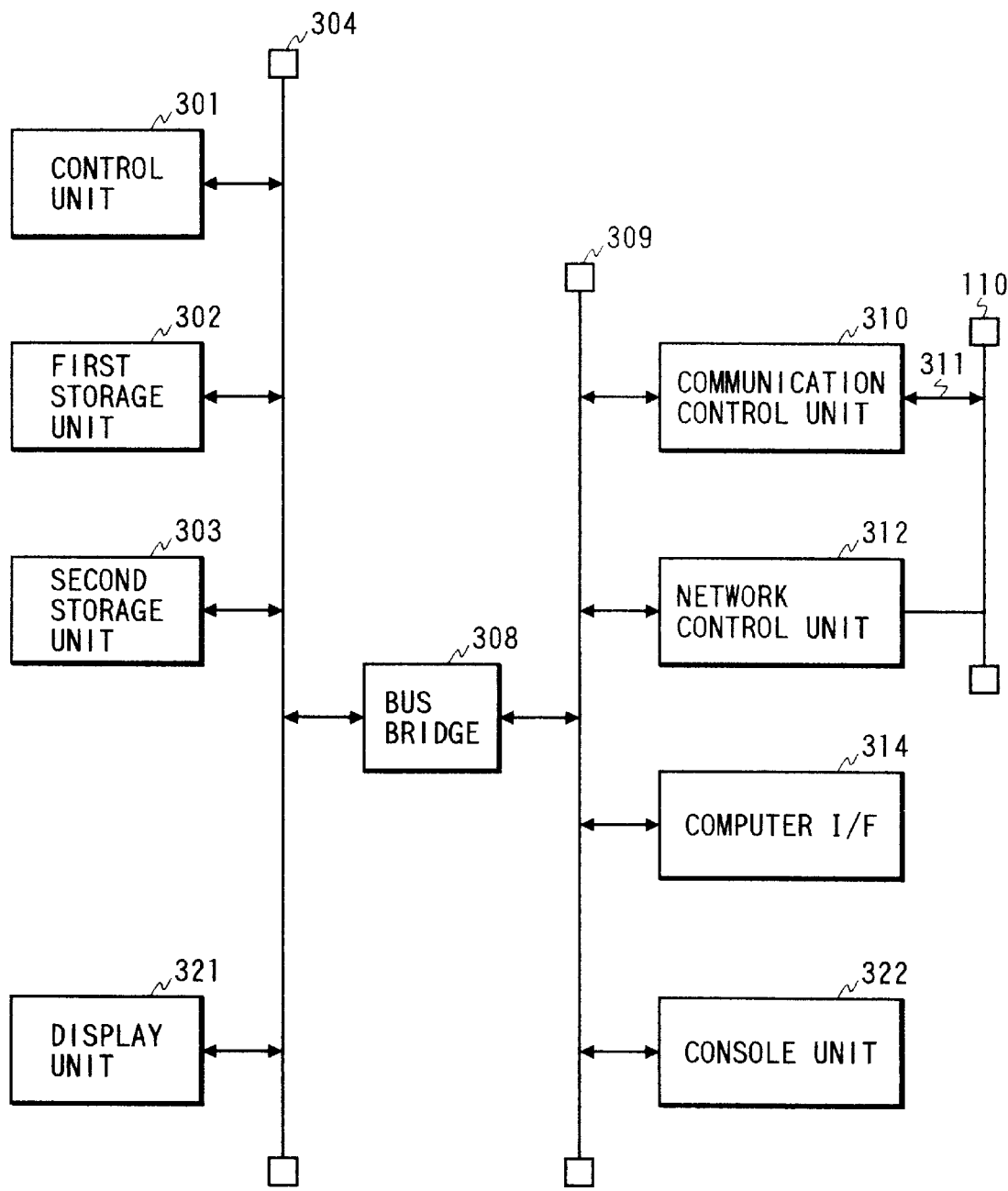
FIG. 3 is a block diagram showing structure of a server shown in FIG. 1.

Subsequently, structure of the above-described server 120 will be explained hereinafter with reference to FIG. 3. A control unit 301 is a microprocessor which controls the server 120 as a whole and is operated based on the real-time OS. A first storage unit 302 acts as a working memory when the control unit 301 operates and can be accessed from the control unit 301 at high speed. A second storage unit 303 is a large-capacity hard disk which stores a plurality of application programs used in the operation of the control unit 301 and is controlled or managed by the control unit 301.

A high-speed CPU bus 304 is a bus which connects the above-described control unit 301, the first storage unit 302, the second storage unit 303 and later-described various functional units with others. The high-speed CPU bus 304 transfers data processed by the control unit 301 to each functional unit, or transfers data among the various functional units at high speed (i.e., DMA transfer). Generally, the VL bus or the PCI bus can be used as the high-speed CPU bus 304.

A bus bridge 308 is a bus bridge controller which is used to connect the high-speed CPU bus 304 and a low-speed CPU bus 309 (described later) with each other, and absorbs a difference in processing speed between these buses. By providing the bus bridge 308, the control unit 301 which operates at high speed can access functional units which are connected to the low-speed CPU bus 309 and operates at low-speed.

The low-speed CPU bus 309 has bus structure of which transferring speed is lower than that of the high-speed CPU bus 304. The functional units of which processing ability (i.e., processing speed) are relatively low are connected to the low-speed CPU bus 309. Generally, the ISA bus or the like can be used as the bus 309.

A communication control unit 310 is a functional unit to which a public line 311 and the low-speed CPU bus 309 are connected. In a case where the public line 311 is an analog line, the communication control unit 310 has a function for modulating digital data from the low-speed CPU bus 309 such that the digital data can be transferred to the public line 311, and has a modem function for converting data which has been transferred from the public line 311 and then modulated, into the digital data which can be processed in the server 120. On the other hand, in a case where the public line 311 is a digital line such as the ISDN or the like, the communication control unit 310 has a terminal adapter function for converting data from the low-speed CPU bus 309 into data of a predetermined data format according to the digital line, and inversely converting data which has been transferred from the digital line in the predetermined format, into the data which can be processed in the server 120. The public line 311 is the analog or digital public line such as the wire telephone line, the wireless telephone line, the ISDN or the like. A network control unit 312 is a functional unit for connecting the server 120 to the network 110, and transfers and receives the data with the network 110. Generally, the Ethernet, the token ring network or the like can be used as the network to be connected.

As the network 110, the Ethernet, the token ring network, an ATM-LAN (asynchronous transfer mode LAN) or the like can be used. A computer interface 314 is a functional unit for connecting the server 120 to peripheral equipments. Generally, the RS-232C for performing serial communication, the Centronics interface for performing parallel communication, the SCSI, the IEEE 1394 interface, the Fibre-Channel interface, the SSA interface or the like can be used as the computer interface 314.

A display unit 321 is composed of a liquid crystal display unit, a speaker and the like and displays necessary characters, images, voice and the like in accordance with program execution by the control unit 301. A console unit 322 is composed of a keyboard, a microphone and the like. The console unit 322 inputs various setting values necessary for the operation of the server 120 and/or inputs various operation instructions to the control unit 301.

Figure 4:
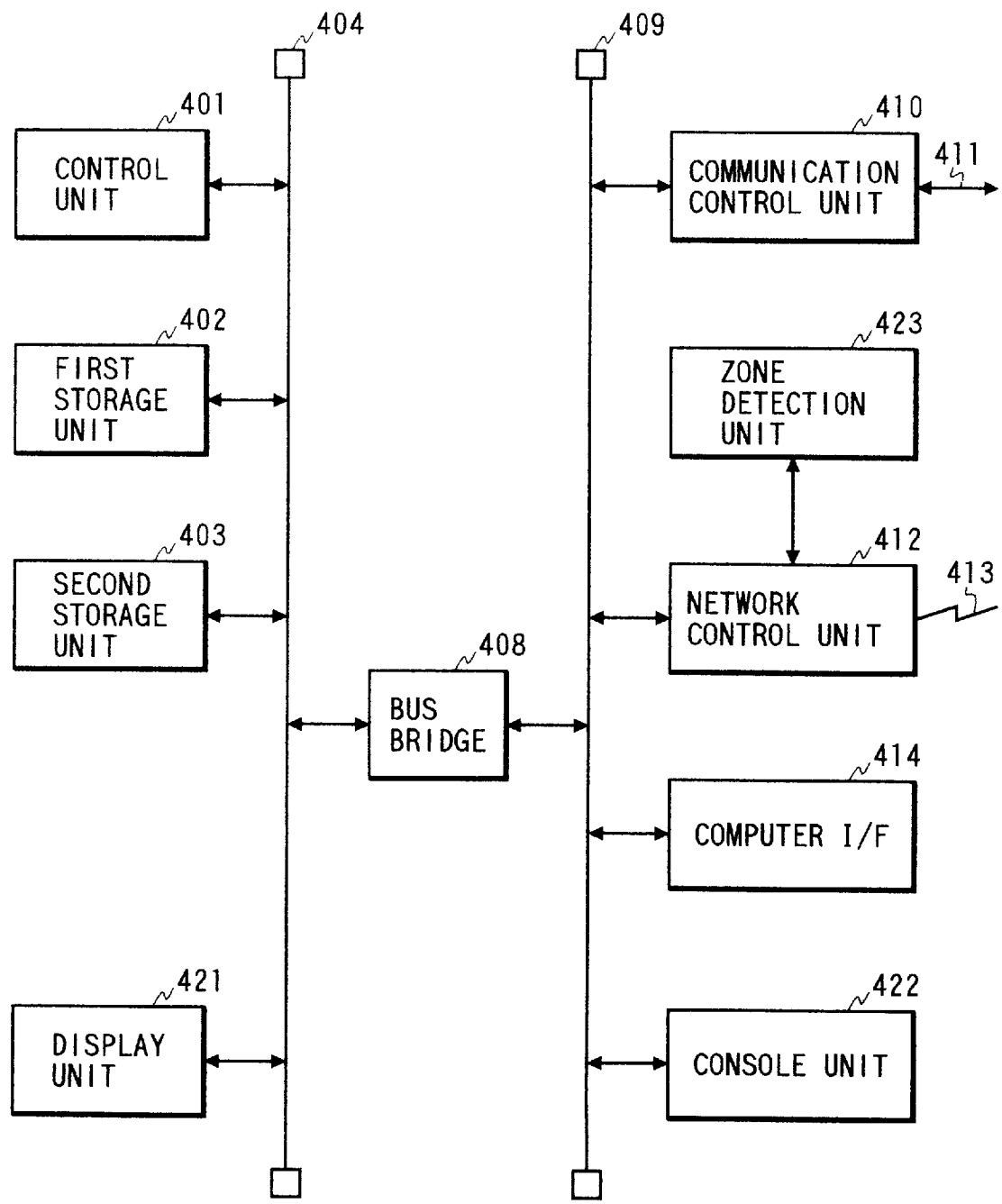
FIG. 4 is a block diagram showing structure of a computer shown in FIG. 1.

Subsequently, structure of the above-described computers 140 and the like will be explained hereinafter with reference to FIG. 4.

A control unit 401 which is a microprocessor for controlling the computer as a whole is operated on the basis of the real-time OS. A first storage unit 402 acts as a working memory when the control unit 401 operates and can be accessed from the control unit 401 at high-speed. A second storage unit 403 is a large-capacity hard disk which stores a plurality of application programs (including programs used for executing processes in flow charts of FIGS. 5, 6, 7 and 8 described later) used in the operation of the control unit 401 and is controlled or managed by the control unit 401.

A high-speed CPU bus 404 is a bus which connects the above-described control unit 401, the first storage unit 402, the second storage unit 403 and later-described various functional units with others. The high-speed CPU bus 404 transfers data processed by the control unit 401 to each functional unit, or transfers data among the various functional units at high speed (i.e., DMA transfer). Generally, the VL bus or the PCI bus can be used as the high-speed CPU bus 404.

A bus bridge 408 is a bus bridge controller which is used to connect the high-speed CPU bus 404 and a low-speed CPU bus 409 (described later) with each other, and absorbs a difference in processing speed between these buses. By providing the bus bridge 408, the control unit 401 which operates at high speed can access functional units which are connected to the low-speed CPU bus 409 and operate at low speed.

The low-speed CPU bus 409 has bus structure of which transferring speed is lower than that of the high-speed CPU bus 404. The functional units of which processing ability (i.e., processing speed) are relatively low are connected to the low-speed CPU bus 409. Generally, the ISA bus or the like can be used as the bus 409.

A communication control unit 410 is a functional unit to which a public line 411 and the low-speed CPU bus 409 are connected. In a case where the public line 411 is an analog line, the communication control unit 410 has a function for modulating digital data from the low-speed CPU bus 409 such that the digital data can be transferred to the public line 411, and has a modem function for converting data which has been transferred from the public line 411 and then modulated, into the digital data which can be processed in the computer. On the other hand, in a case where the public line 411 is a digital line such as the ISDN or the like, the communication control unit 410 has a terminal adapter function for converting data from the low-speed CPU bus 409 into data of a predetermined data format according to the digital line, and inversely converting data which has been transferred from the digital line in the predetermined format, into the data which can be processed in the computer.

The public line 411 is the analog or digital public line such as the wire telephone line, the wireless telephone line, the ISDN or the like. A network control unit 412 is a functional unit for connecting the computer to the network 110, and transfers and the receives the data with the network 110. Generally, the Ethernet, the token ring network or the like can be used as the network to be connected. Moreover, in case of transferring and receiving the data with a wireless network, the network control unit 412 has a modulation and demodulation function according to the modulation wave such as the radio wave (e.g., high-frequency wave), the light (e.g., infrared ray), the acoustic wave (e.g., supersonic wave) or the like.

Reference numeral 413 denotes a wireless network in which a data packet is transmitted and received between the network control unit 412 and the wireless base station by using, e.g., the radio wave such as the high-frequency wave or the like, the light such as the infrared ray or the like, the acoustic wave such as the supersonic wave or the like.

A computer interface 414 is a functional unit for connecting the computer and peripheral equipments with each other. Generally, the RS-232C for performing serial communication, the Centronics interface for performing parallel communication the SCSI, the IEEE 1394 interface, the Fibre-Channel interface, the SSA interface or the like can be used as the interface 414.

A display unit 421 is composed of a liquid crystal display unit, a speaker and the like and displays necessary characters, images, voice and the like in accordance with program execution by the control unit 401. A console unit 422 is composed of a keyboard, a microphone and the like. The console unit 422 inputs various setting values necessary for the operation of the computer and/or inputs various operation instructions to the control unit 401.

Reference numeral 423 denotes a zone detection unit which receives a zone signal transmitted from each wireless base station via the network control unit 412. In each zone signal, e.g., the frequency, the phase, the amplitude and/or the identification code are included respectively in different formats. When intensity of the zone signal is detected by the zone detection unit 423, there can be known that the computer is positioned in which cognizant zone.

Hereinafter, operations of the first embodiment structured as above will be explained with reference to flow charts shown in FIGS. 5, 6, 7, 8 and 9. Each flow chart shows an operation flow which is controlled by the control unit on the basis of a program code installed in the hard disk (i.e., second storage unit) in each apparatus.

Figure 5:
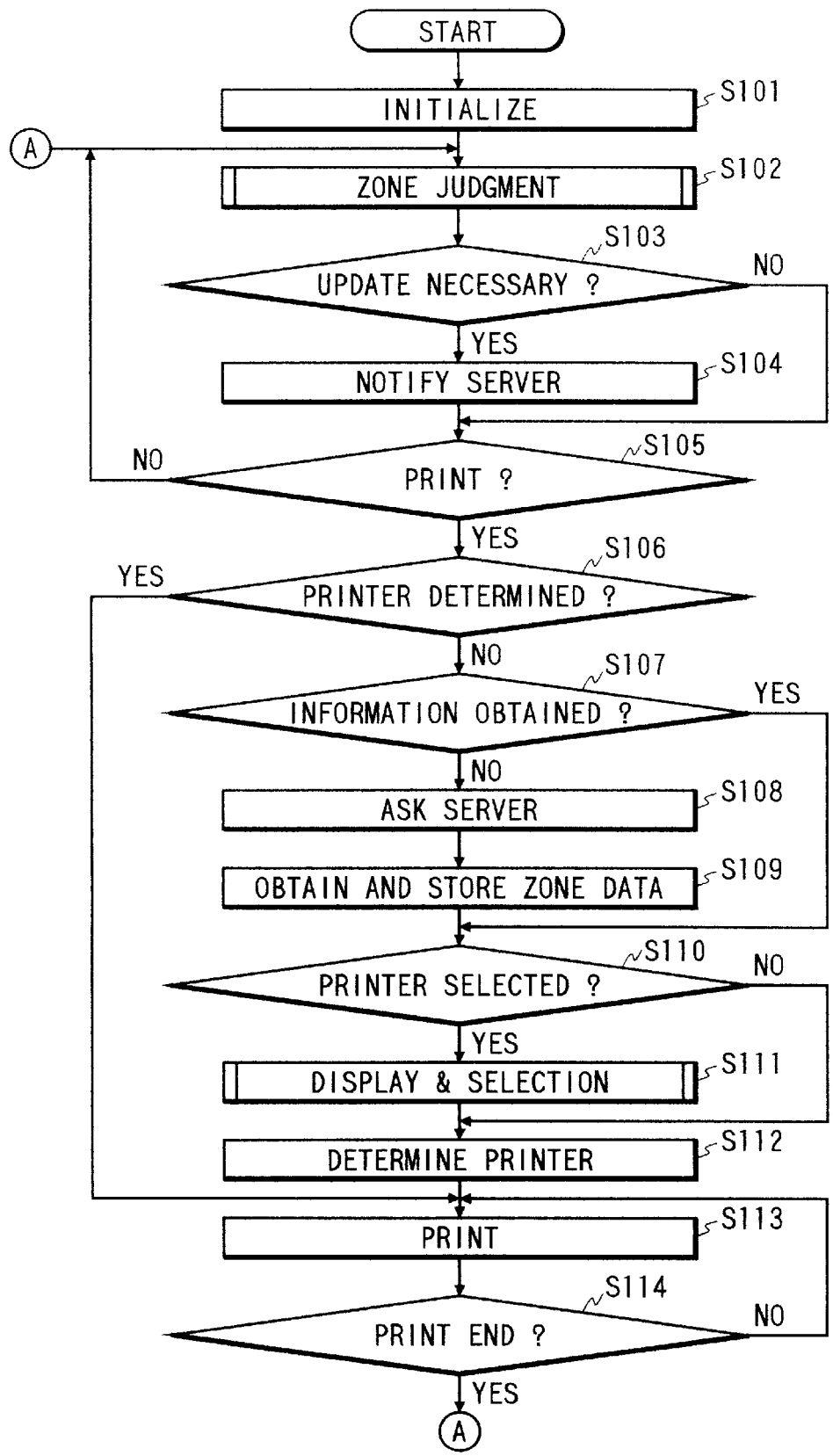
FIG. 5 is a flow chart showing a main routine of the computer according to the first embodiment.
Figure 6:
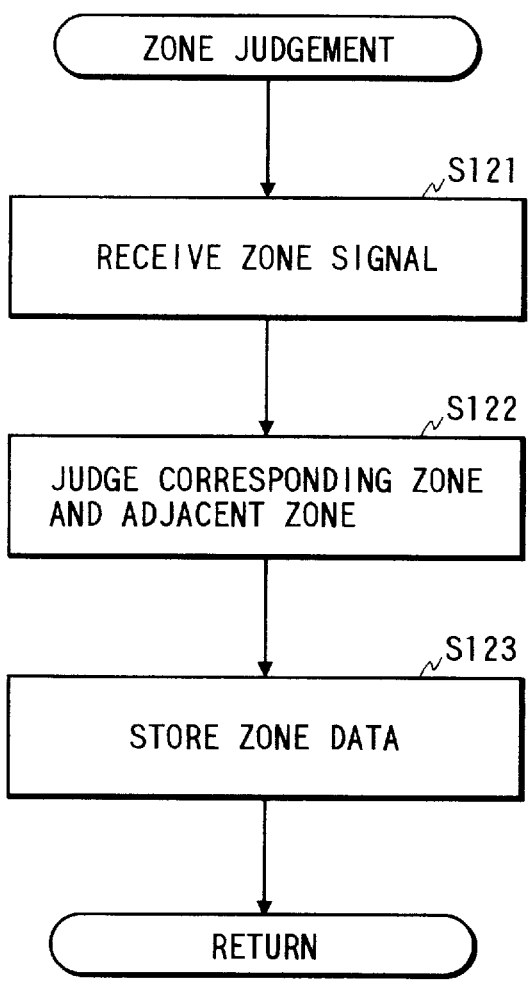
FIG. 6 is a detailed flow chart showing a zone judgment process according to the first embodiment.
Figure 7:
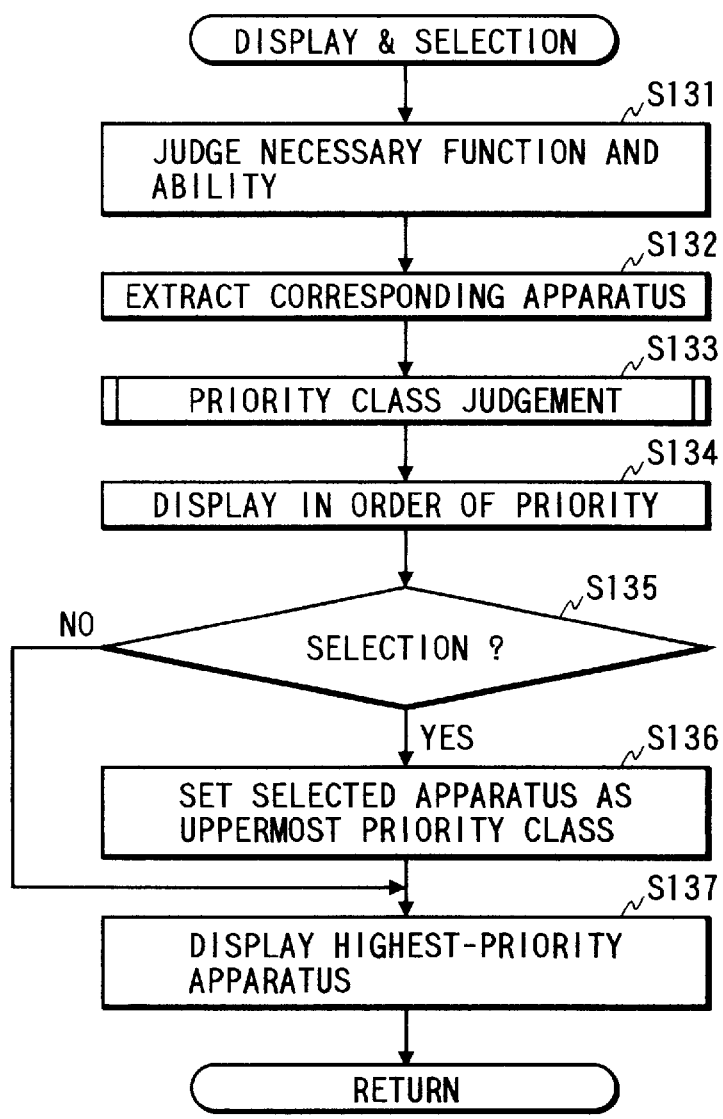
FIG. 7 is a detailed flow chart showing a display and selection process according to the first embodiment.
Figure 8:
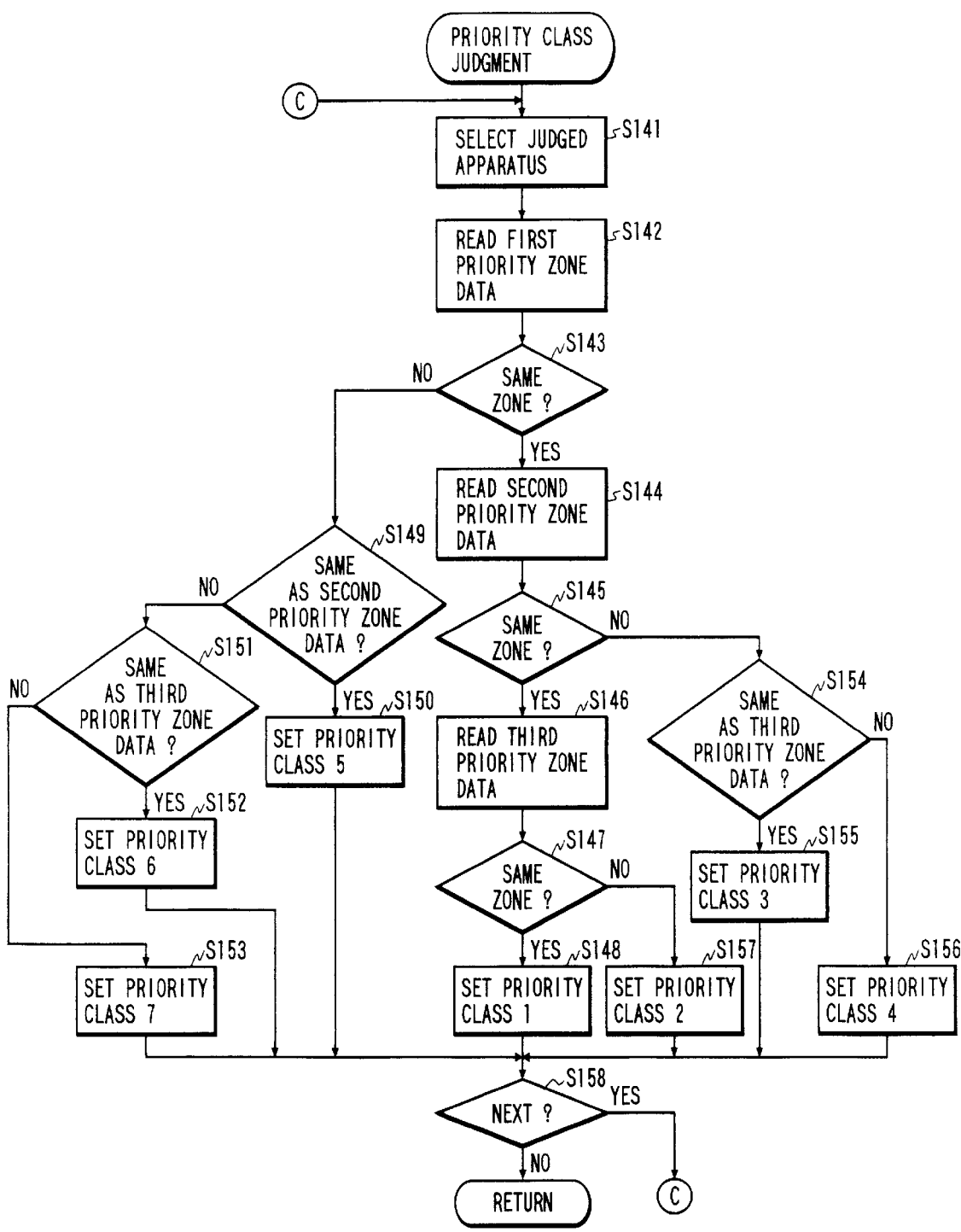
FIG. 8 is a detailed flow chart showing a priority class judgment process according to the first embodiment.
Figure 9:
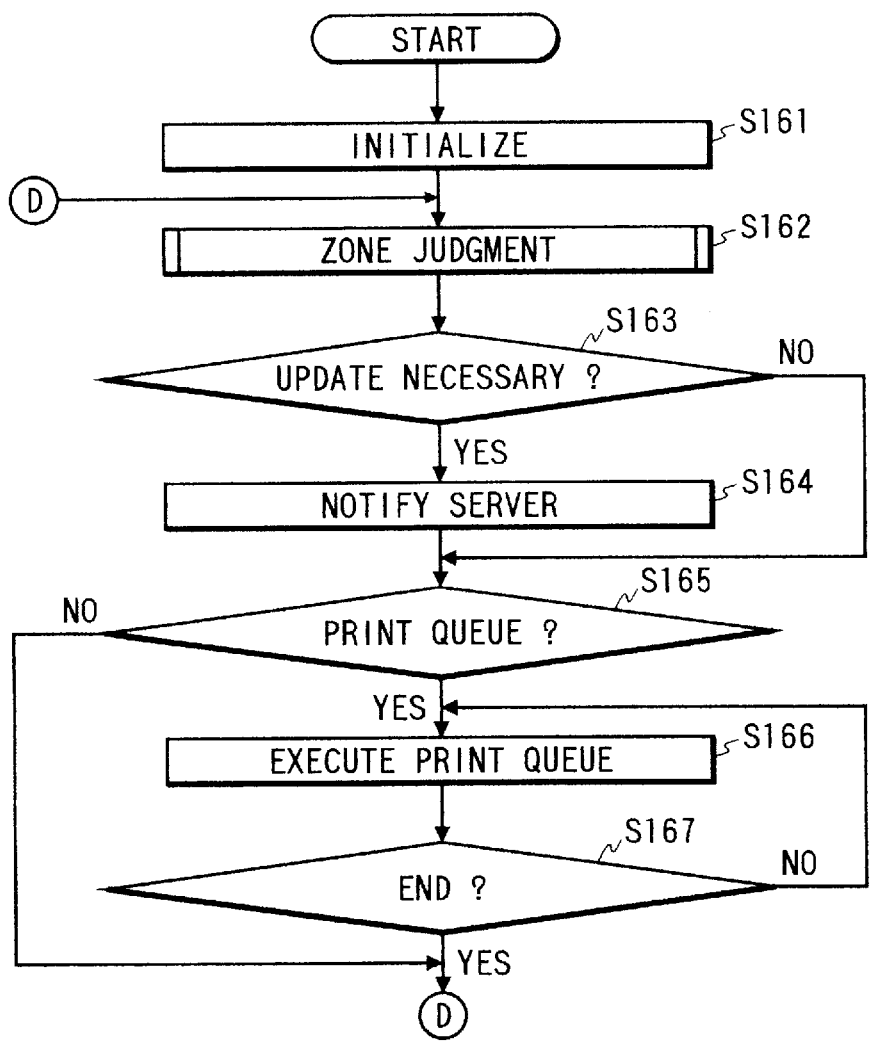
FIG. 9 is a flow chart showing a main routine of the image formation apparatus according to the first embodiment.

That is, FIG. 5 is the flow chart showing a main routine of the computer 146 in the first embodiment, FIG. 6 is the detailed flow chart showing a zone judgment process in the first embodiment, FIG. 7 is the detailed flow chart showing a display and selection process in the first embodiment, FIG. 8 is the detailed flow chart showing a priority class judgment process in the first embodiment, and FIG. 9 is the flow chart showing a main routine of the image formation apparatus 134 in the first embodiment.

Initially, the operation of the computer 146 will be explained hereinafter with reference to FIG. 5.

When a power of the computer 146 is turned on, the control unit 401 initializes a flag, a control variable and the like. Further, the control unit 401 executes a control program such as an operating system or the like stored in a partial area of the first storage unit 402, and also initializes each unit in the computer 146 (step S101).

In order to judge which wireless base station the computer 146 is positioned in its cognizant zone, the control unit 401 performs the zone judgment process (step S102). Details of the zone judgment process will be explained later. Then, as a result of zone judgment, if zone data has not been stored or there is necessary to update the zone data because, e.g., the computer 146 was moved and thus has been positioned in the cognizant zone of the another wireless base station (step S103), the control unit 401 notifies the server 120 of the updated zone data via the wireless network 160, the wireless base station 114 and the network 110 (step S104). In such a notification process, in addition to the zone data, the control unit 401 notifies the server 120 of a kind code of computer, a name of manufacture, a name of product, a name registered in the network, operating condition, error condition, held (or stored) functional information and the like. As a result of the zone judgment, if the update of zone data is not necessary (step S103), the flow advances to a step S105.

In a case where the control unit 401 does not perform various processes such as a printing process, a facsimile process, a scanning process, an electronic filing process and the like by using the image formation apparatus connected to the network, the flow returns to the step S102 to repeat the predetermined process. On the other hand, in a case where the control unit 401 performs the various processes such as the printing process, the facsimile process, the scanning process, the electronic filing process and the like by using the image formation apparats connected to the network (step S105), if the image process apparatus to be used is not yet determined (step S106), in order to obtain or acquire information concerning which apparatus among the plurality of the image formation apparatuses connected to the network has a necessary function and which apparatus is closest to the computer 146 (step S107), the control unit 401 asks or inquires the server 120 about such the information (step S108). Then, the obtained zone data is stored in the first storage unit 402 and/or the second storage unit 403 (step S109).

Such the zone data is the data which has been notified from each computer or each image formation apparatus to the server 120, via each wireless network, each wireless base station and the network 110. For example, as shown in FIG. 10, for each computer and each image formation apparatus, cognizant zones in which such the computer or the image formation apparatus is positioned have been sequentially stored as the zone data, e.g., a first priority zone, a second priority zone, a third priority zone, . . . The server 120 stores al of the zone data which are cognizant or managed by the wireless base stations connected to the network 110, and notifies of the necessary zone data in accordance with inquiry from each equipment or each wireless base station. In a case where the image formation apparatus to be used has been already determined (step S106), the flow advances to a step S113.

In a case where the image formation apparatus to be used is selected by using the obtained zone data (step S110), the control unit 401 performs the display and selection process (step S111). Details of the display and selection process will be explained later. If the image formation apparatus to be used is determined (step S112), the control unit 401 requests the image formation apparatus to perform the various processes such as the printing process, the facsimile process, the scanning process, the electronic filing process and the like. For example, in a case where the printing process is performed by the image formation apparatus 134, image formation command data (to be used for the image formation) is transferred to the image formation apparatus 134 via the wireless network 160, the wireless base station 114 and the wireless network 162. Then, the image formation apparatus 134 to which the image formation command data has been transferred develops such the image formation command data into the bit-map image data, to perform printing (step S113).

When the various processes which has been requested to the image formation apparatus terminate (step S114), the flow returns to the step S102 to repeat the predetermined process.

FIG. 6 is the detailed flow chart showing the zone judgment process in the step S102 of FIG. 5 and a step S162 of FIG. 9. Initially, the zone judgment process by the computer in the step S102 (FIG. 5) will be explained hereinafter with reference to FIG. 11.

Figure 11:
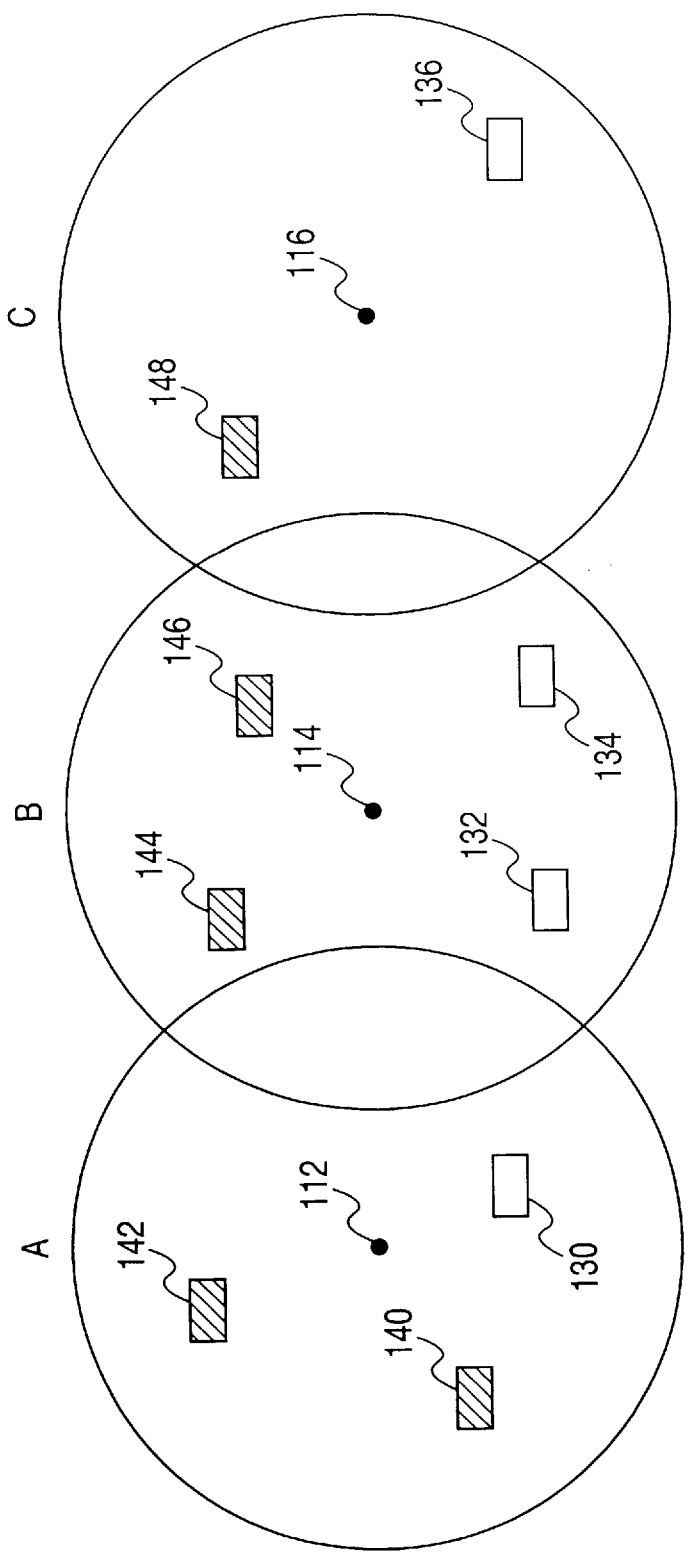
FIG. 11 is a view showing positional relations of each computer and a plurality of wireless (or radio) base stations.

FIG. 11 shows an example in which the computers 140 and 142 are positioned within the cognizant zone (i.e., A zone) of the wireless base station 112, the computers 144 and 146 are positioned within the cognizant zone (i.e., B zone) of the wireless base station 114 and the computer 148 is positioned within the cognizant zone (i.e., C zone) of the wireless base station 116.

The control unit 401 receives the zone signal from each of the wireless base stations 112, 114 and 116 (step S121). In each zone signal, e.g., the frequency, the phase, the amplitude and/or the identification code are included respectively in different formats. When the intensity of the zone signal is detected, there can be known which cognizant zone the computer is positioned in. The control unit 401 judges the corresponding zone and the adjacent zones on the basis of the intensity of the zone signal transmitted from each wireless base station to the zone detection unit 423 via the network control unit 412 (step S122). For example, in case of FIG. 11, if the zone signal from the wireless base station 114 is detected as having the largest intensity, the computer 146 can judge that the B zone is the corresponding zone. Further, if the zone signal from the wireless base station 116 is detected as having the secondarily-largest intensity and the zone signal from the wireless base station 112 is detected as having the thirdly-largest intensity, the computer 146 can judge that the C zone and the A zone are the adjacent zones.

In an another example, if the computer 140 detects the zone signal from the wireless base station 112 as having the largest intensity, the computer 140 can judge that the A zone is the corresponding zone. Further, if the zone signal from the wireless base station 114 is detected as having the secondarily-largest intensity, the computer 140 can judge that the B zone is the adjacent zone. In this case, it is possible that the zone signal from the wireless base station 116 has been weakened when it reaches the computer 140 and thus a level of such the zone signal is not enough to be used in the judgment, whereby the C zone can not be judged as the next (i.e., secondary) adjacent zone. When the control unit 401 stores the zone data representing the judged corresponding zone and the adjacent zones into the first storage unit 402 and/or the second storage unit 403 (step S123), the zone judgment process terminates (step S102).

Subsequently, the zone judgment process by the image formation apparatus in the step S162 (FIG. 9) will be explained hereinafter with reference to FIG. 11. As shown in FIG. 11, the image formation apparatus 130 is positioned within the cognizant zone (i.e, A zone) of the wireless base station 112, the image formation apparatuses 132 and 134 are positioned within the cognizant zone (i.e., B zone) of the wireless base station 114 and the image formation apparatus 136 is positioned within the cognizant zone (i.e., C zone) of the wireless base station 116.

The control unit 201 receives the zone signal from each of the wireless base stations 112, 114 and 116 (step S121). In each zone signal, e.g., the frequency, the phase, the amplitude and/or the identification code are included respectively in different formats. When the intensity of the zone signal is detected, there can be known which cognizant zone the image formation apparatus is positioned in.

The control unit 201 judges the corresponding zone and the adjacent zones on the basis of the intensity of the zone signal transmitted from each wireless base station to the zone detection unit 223 via the network control unit 212 (step S122). For example, in case of FIG. 11, if the zone signal from the wireless base station 114 is detected as having the largest intensity, the image formation apparatus 134 can judge that the B zone is the corresponding zone. Further, if the zone signal from the wireless base station 116 is detected as having the secondarily-largest intensity and the zone signal from the wireless base station 112 is detected as having the thirdly-largest intensity, the image formation apparatus 134 can judge that the C zone and the A zone are the adjacent zones. In an another example, if the image formation apparatus 130 detects the zone signal from the wireless base station 112 as having the largest intensity, the image formation apparatus 130 can judge that the A zone is the corresponding zone. Further, if the zone signal from the wireless base station 114 is detected as having the secondarily-largest intensity, the image formation apparatus 130 can judge that the B zone is the adjacent zone. In this case, it is possible that the zone signal from the wireless base station 116 has been weakened when it reaches the image formation apparatus 130 and thus a level of such the zone signal is not enough to be used in the judgment, whereby the C zone can not be judged as the next (i.e., secondary) adjacent zone.

When the control unit 201 stores the zone data representing the judged corresponding zone and the adjacent zones into the first storage unit 402 and/or the second storage unit 403 (step S123), the zone judgment process terminates (step S162).

FIG. 7 is the detailed flow chart showing the display and selection process in the step S111 of FIG. 5.

In case of requesting the image formation apparatus to perform the various processes such as the printing process, the facsimile process, the scanning process, the electronic filing process and the like, the control unit 201 or 401 judges functions and ability which are necessary in the image formation apparatus (step S131). Subsequently, the control unit 201 or 401 extracts the corresponding apparatus suitable for the process, from among the data obtained in the step S109 (FIG. 5) (step S132), and then performs the priority class judgment process on the basis of the extracted corresponding apparatus by using the zone data obtained in the step S109 (FIG. 5) (step S133). Details of the priority class judgment process (step S133) will be explained later.

After then, the control unit 201 or 401 causes the display unit 422 to display the extracted corresponding apparatuses in priority order, on the basis of a judged priority class (step S134). If the image formation apparatus which is attended to be used is selected from among the displayed apparatuses by using the console unit 421 (step S135), the control unit 201 or 401 sets the selected apparatus as an uppermost class in the priority class (step S136). On the other hand, if not selected from among the displayed apparatuses (step S135), the order displayed in the step S134 is maintained as it is, and the flow advances to a step S137. In the step S137, the control unit 201 or 401 causes the display unit 422 to display the highest-priority apparatus (step S137), and the display and selection process terminates (step S111).

FIG. 8 is the detailed flow chart showing the priority class judgment process in the step S133 of FIG. 7.

If the apparatus to be subjected to the priority class judgment is selected from among the corresponding apparatuses extracted in the step S132 in FIG. 7 (step S141), the control unit 201 or 401 reads first priority zone data of the selected apparatus (step S142). If the read first priority zone data is identical with own first priority zone data (step S143), the control unit 201 or 401 continually reads second priority zone data of the selected apparatus (step S144). If the read second priority zone data is identical with own second priority zone data (step S145), the control unit 201 or 401 continually reads third priority zone data of the selected apparatus (step S146). If the read third priority zone data is identical with own third priority zone data (step S147), the control unit 201 or 401 sets "priority class 1" for the selected apparatus (step S148). On the other hand, if the read third priority zone data is different from own third priority zone data in the step S147, the control unit 201 or 401 sets "priority class 2" for the selected apparatus (step S157).

In a case where the read second priority zone data is different from own second priority zone data in the step S145, if the read second priority zone data is identical with own third priority zone data (step S154), the control unit 201 or 401 sets "priority class 3" for the selected apparatus (step S155). In a case where the read second priority zone data is different from own third priority zone data in the step S154, the control unit 201 or 401 sets "priority class 4" for the selected apparatus (step S156). In a case where the read first priority zone data is different from own first priority zone data in the step S143, if the read first priority zone data is identical with own second priority zone data (step S149), the control unit 201 or 401 sets "priority class 5" for the selected apparatus (step S150).

In a case where the read first priority zone data is different from own second priority zone data in the step S149, if the read first priority zone data is identical with own third priority zone data (step S151), the control unit 201 or 401 sets "priority class 6" for the selected apparatus (step S152). In a case where the read first priority zone data is different from own third priority zone data in the step S151, the control unit 201 or 401 sets "priority class 7" for the selected apparatus (step S153).

Hereinafter, there will be explained an example in which the zone data obtained from the server 120 by the computer 146 has the contents as shown in FIG. 10.

For the computer 146, the first priority zone is the B zone, the second priority zone is the C zone and the third priority zone is the A zone. Also, for the image formation apparatus 134, the first priority zone is the B zone, the second priority zone is the C zone and the third priority zone is the A zone. According to the above-described priority class judgment process, the image formation apparatus 134 is judged or set as the "priority class 1".

Similarly, in FIG. 10, for the computer 146, the image formation apparatus 132 and the computer 146 are judged or set as the "priority class 4", the image formation apparatus 130 and the computers 140 and 142 are judged or set as the "priority class 6", and the image formation apparatus 136 and the computer 146 are judged or set as the "priority class 5".

In a case where the setting of the priority class terminates in either the step S148, S157, S155, S156, S150, S152 or S153, if there is the apparatus to be next judged (step S158), the flow returns to the step S141 to repeat a series of the processes.

If the setting of the priority class terminates for all the apparatuses to be judged, the priority class judgment process (step S133) terminates.

Subsequently, the operation of the image formation apparatus 134 will be explained hereinafter with reference to FIG. 9.

When a power of the image formation apparatus 134 is turned on, the control unit 201 initializes a flag, a control variable and the like. Further, the control unit 201 executes a control program such as an operating system or the like stored in a partial area of the first storage unit 202, and also initializes each unit in the image formation apparatus 134 (step S161).

In order to judge which wireless base station the image formation apparatus 134 is positioned in its cognizant zone, the control unit 201 performs the zone judgment process (step S162). The details of the zone judgment process have been explained as above. Then, as a result of zone judgment, if zone data has not been stored or there is necessary to update the zone data because the image formation apparatus 134 was moved and thus has been positioned in the cognizant zone of the another wireless base station (step S163), the control unit 201 notifies the server 120 of the updated zone data via the wireless network 162, the wireless base station 114 and the network 110 (step S164). In such a notification process, in addition to the zone data, the control unit 201 notifies the server 120 of a kind code of image formation apparatus, a name of manufacturer, a name of product, a name registered in the network, operating condition, error condition, held (or stored) functional information and the like. As a result of the zone judgment, if the update of zone data is not necessary (step S163), the flow advances to a step S165. In a case where the computer or the another image formation apparatus both connected to the network requested various processes such as a printing process, a facsimile process, a scanning process, an electronic filing process and the like (step S165), the control unit 201 performs such the processes (step S166). For example, if the printing process is requested by the computer 146, the image formation command data (to be used for the image formation) which has been transferred via the wireless network 160, the wireless base station 114 and the wireless network 162 is developed into the bit-map image data and thus the printing is performed. When the requested various processes terminate (step S167), the flow returns to the step S162 to repeat the predetermined process.

(Second Embodiment)

Subsequently, the second embodiment of the present invention will be explained hereinafter.

The structure of the image process system in the second embodiment is substantially the same as that shown in FIGS. 1 to 4. Therefore, the detailed explanation thereof is omitted in the second embodiment. However, main routines of the computer 146 and the image formation apparatus 134 are made different from those in the first embodiment, as shown in FIGS. 12 and 13, and program codes for executing these routines are respectively stored in the second storage units 403 and 203.

Hereinafter, operations of the present embodiment will be explained. In this case, the zone judgment process in a step S172 and the display and selection process in a step S179 (both shown in FIG. 12) are substantially the same as those in the first embodiment shown in FIGS. 6 to 8. Therefore, the detailed explanation thereof is omitted in the second embodiment.

Figure 12:
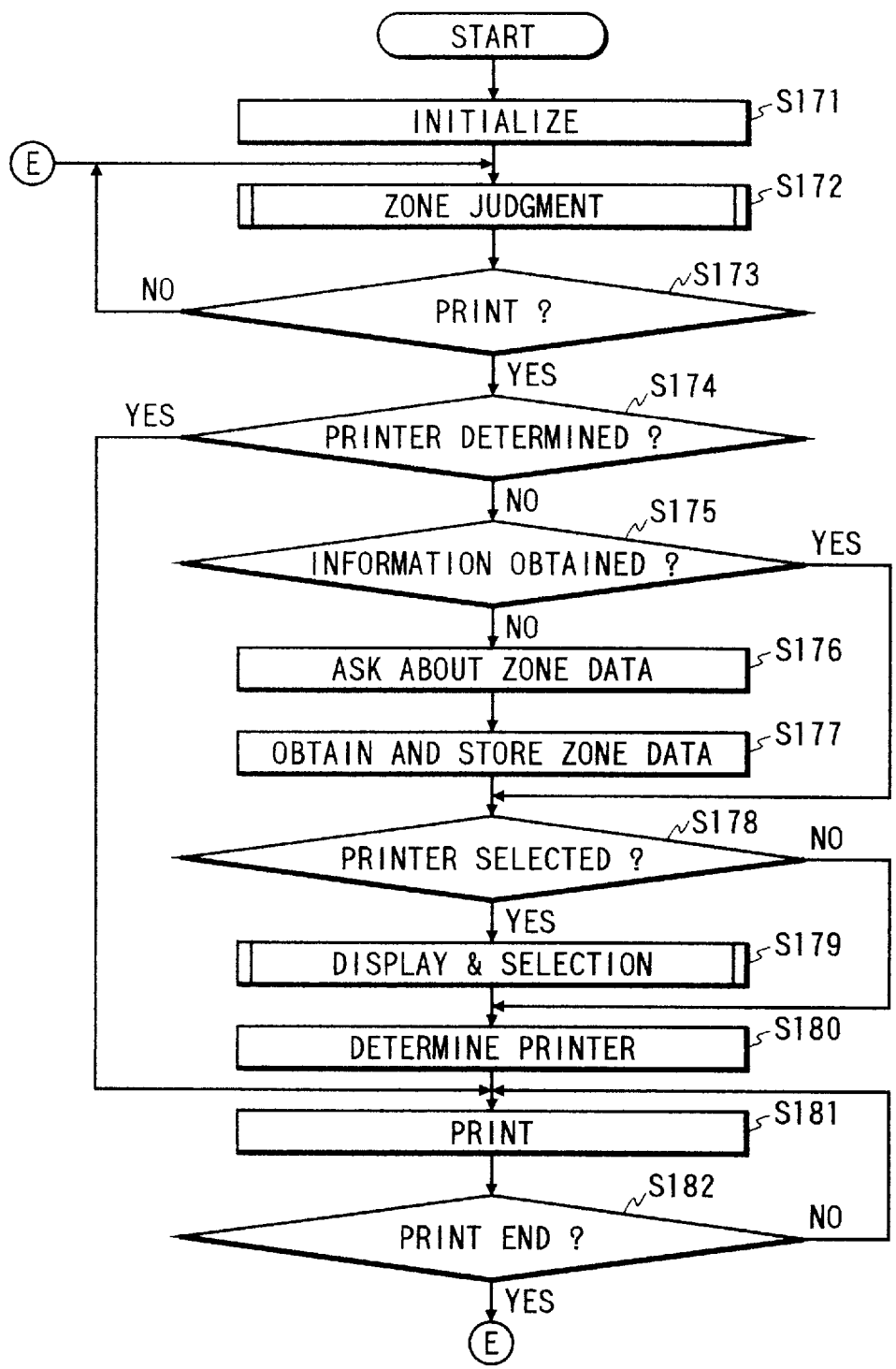
FIG. 12 is a flow chart showing a main routine of a computer according to a second embodiment of the present invention.
Figure 13:
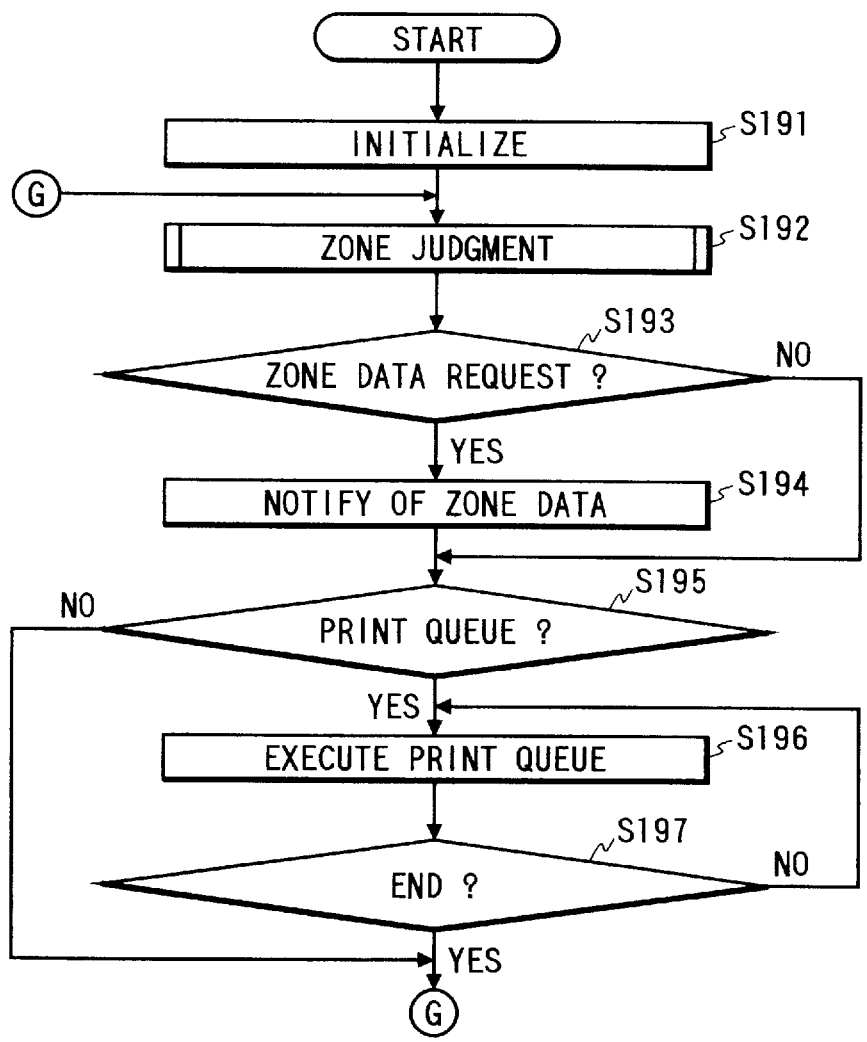
FIG. 13 is a flow chart showing a main routine of an image formation apparatus according to the second embodiment.

FIG. 12 is a flow chart showing the main routine of the computer 146 according to the second embodiment, and FIG. 13 is a flow chart showing the main routine of the image formation apparatus 134 according to the second embodiment.

Initially, the operation of the computer 146 will be explained hereinafter with reference to FIG. 12.

When the power of the computer 146 is turned on, the control unit 401 initializes the flag, the control variable and the like. Further, the control unit 401 executes the control program such as the operating system or the like stored in the partial area of the first storage unit 402, and also initializes each unit in the computer 146 (step S171). In order to judge which wireless base station the computer 146 is positioned in its cognizant zone, the control unit 401 performs the zone judgment process (step S172). The details of the zone judgment process have been already explained in the first embodiment.

In a case where the control unit 401 does not perform the various processes such as the printing process, the facsimile process, the scanning process, the electronic filing process and the like by using the image formation apparatus connected to the network, the flow returns to the step S172 to repeat the predetermined process.

On the other hand, in a case where the control unit 401 performs the various processes such as the printing process, the facsimile process, the scanning process, the electronic filing process and the like by using the image formation apparatus connected to the network (step S173), if the image process apparatus to be used is not yet determined (step S174), in order to obtain or acquire the information concerning which apparatus among the plurality of the image formation apparatuses connected to the network has the necessary function and which apparatus is closest to the computer 146 (step S175), the control unit 401 asks or inquires each equipment connected to the network about the zone data (step S176). Then, the zone data obtained from each equipment is stored in the first storage unit 402 and/or the second storage unit 403 (step S177). Such the zone data is the data which has been notified from each computer or each image formation apparatus to the computer 146, via each wireless network, each wireless base station and the network 110.

For example, as the zone data in each column shown in FIG. 10, each computer or each image formation apparatus has stored therein the cognizant zone in which such the computer itself or the image formation apparatus itself is positioned, e.g., the first priority zone, the second priority zone, the third priority zone, . . . In accordance with the inquiry from each equipment or each wireless base station, each computer or each image formation apparatus notifies such the equipment or the wireless base station of the stored zone data via the wireless network and/or the network 110.

In a case where the image formation apparatus to be used has been already determined (step S174), the flow advances to a step S181. In a case where the image formation apparatus to be used is selected by using the obtained zone data (step S178), the control unit 401 performs the display and selection process (step S179). The details of the display and selection process has been already explained in the first embodiment.

If the image formation apparatus to be used is determined (step S180), the control unit 401 requests the image formation apparatus to perform the various processes such as the printing process, the facsimile process, the scanning process, the electronic filing process and the like. For example, in a case where the printing process is performed by the image formation apparatus 134, the image formation command data (to be used for the image formation) is transferred to the image formation apparatus 135 via the wireless network 160, the wireless base station 114 and the wireless network 162. Then, the image formation apparatus 134 to which the image formation command data has been transferred develops such the image formation command data into the bit-map image data, to perform the printing (step S181). After then, if the various processes which have been requested to the image formation apparatus terminate (step S182), the flow returns to the step S172 to repeat the predetermined process.

Subsequently, the operation of the image formation apparatus 134 will be explained hereinafter with reference to FIG. 13.

When the power of the image formation apparatus 134 is turned on, the control unit 201 initializes the flag, the control variable and the like. Further, the control unit 201 executes the control program such as the operating system or the like stored in the partial area of the first storage unit 202, and also initializes each unit in the image formation apparatus 134 (step S191).

In order to judge which wireless base station the image formation apparatus 134 is positioned in its cognizant zone, the control unit 201 performs the zone judgment process (step S192). The details of the zone judgment process have been explained as above.

If the zone data is requested from the another computer or the image formation apparatus (step S193), the control unit 201 notifies the another computer or the image formation apparatus which requested the zone data, of the zone data via the wireless network 162, the wireless base station 114 and/or the network 110 (step S194). In such the notification process, in addition to the zone data, the control unit 201 notifies the another computer or the image formation apparatus, of the kind code of image formation apparatus, the name of manufacturer, the name of product, the name registered in the network, the operating condition, the error condition, the held (or stored) functional information and the like.

If the zone data is not requested from the another computer or the image formation apparatus (step S193), the flow advances to a step S195. In the case where the various processes such as the printing process, the facsimile process, the scanning process, the electronic filing process and the like have been requested from the computer or the another image formation apparatus both connected to the network (step S195), the control unit 201 performs such the processes (step S196). For example, if the printing process is requested by the computer 146, the image formation command data (to be used for the image formation) which has been transferred via the wireless network 160, the wireless base station 114 and the wireless network 162 is developed into the bit-map image data and thus the printing is performed. When the requested various processes terminate (step S197), the flow returns to the step S192 to repeat the predetermined process.

(Third Embodiment)

Subsequently, the third embodiment of the present invention will be explained hereinafter.

The structure of the image process system in the third embodiment is substantially the same as that shown in FIGS. 1 to 4. Therefore, the detailed explanation thereof is omitted in the third embodiment. However, main routines of the computer 146 and the image formation apparatus 134 are made different as shown in FIGS. 14 to 16.

Hereinafter, operations of the present embodiment will be explained. In this case, the zone judgment process in steps S202 and S222 and the display and selection process is a step S214 are substantially the same as those in the first embodiment shown in FIGS. 6 to 8, whereby the detailed explanation thereof is omitted in the third embodiment.

Figure 14:
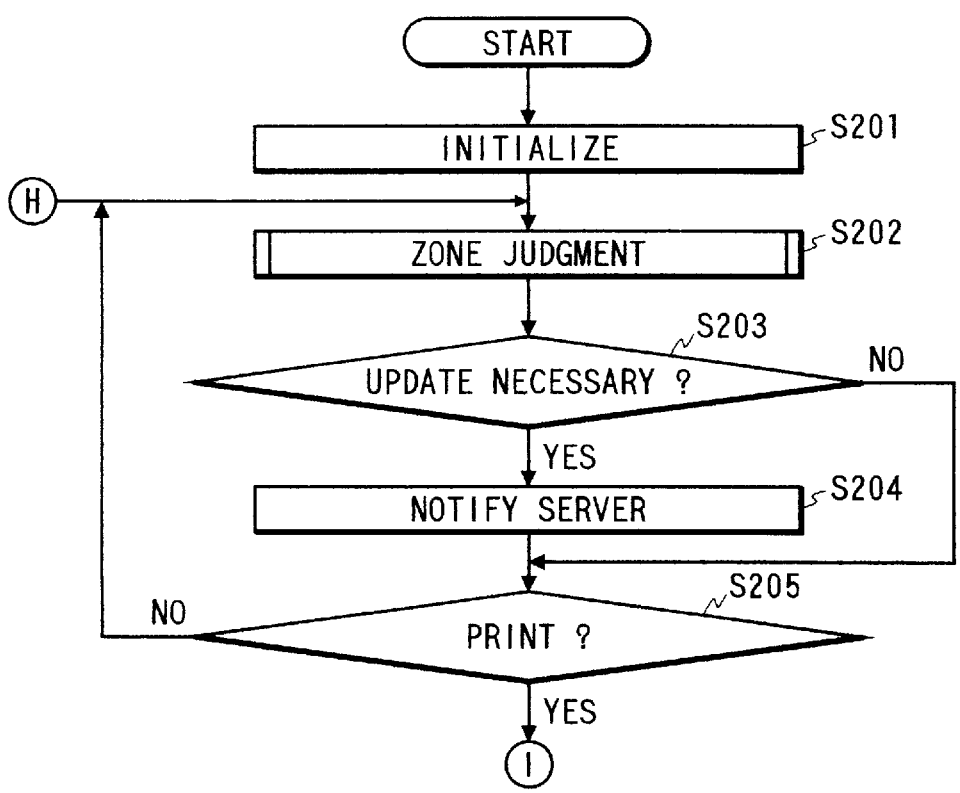
FIG. 14 is a flow chart showing a main routine of a computer according to a third embodiment of the present invention.
Figure 15:
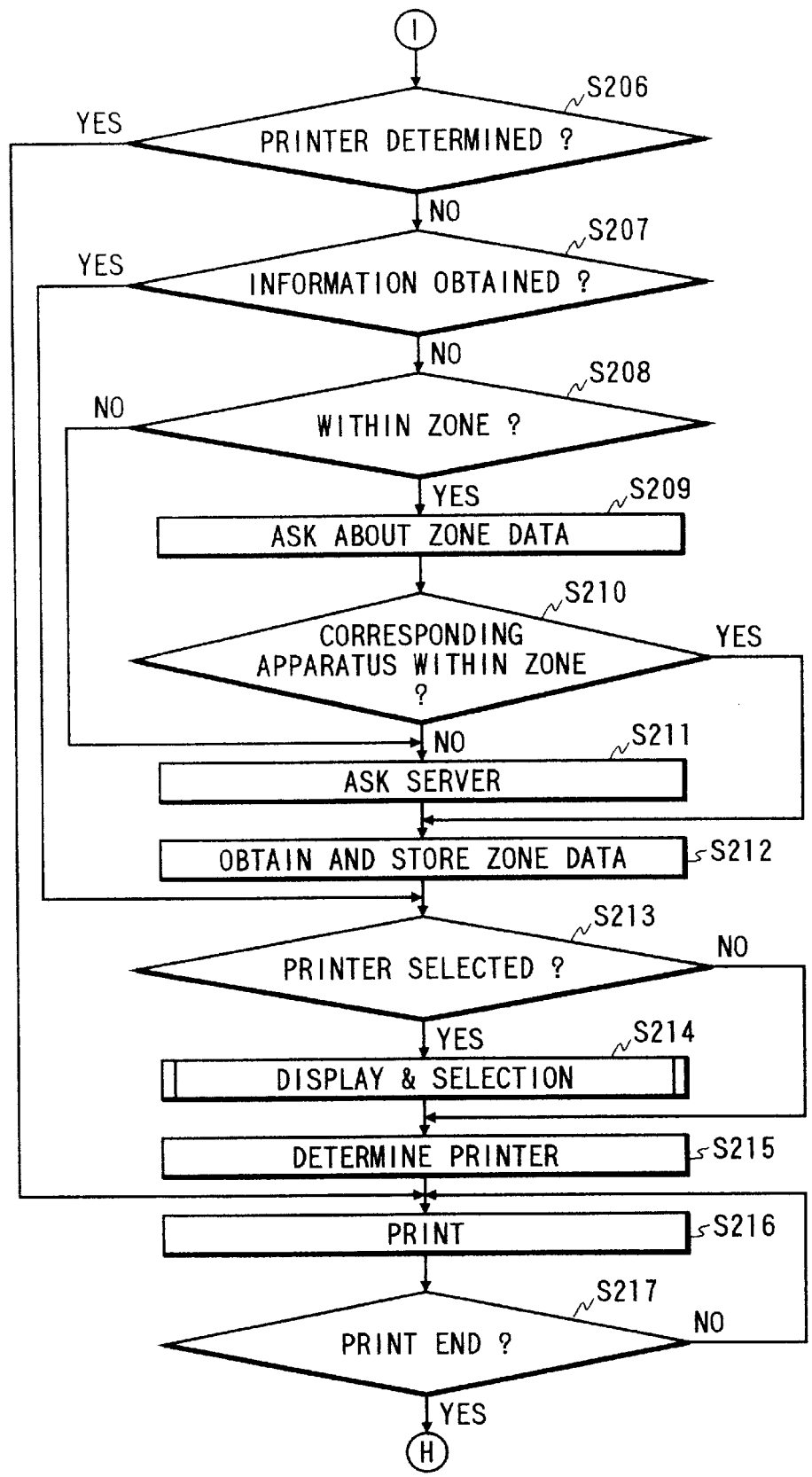
FIG. 15 is a flow chart showing the main routine of the computer according to the third embodiment.

FIGS. 14 and 15 are flow charts showing the main routine of the computer 146 according to the third embodiment, and FIG. 16 is a flow chart showing the main routine of the image formation apparatus 134 according to the third embodiment.

Initially, the operation of the computer 146 will be explained hereinafter with reference to FIG. 14.

When the power of the computer 146 is turned on, the control unit 401 initializes the flag, the control variable and the like. Further, the control unit 401 executes the control program such as the operating system or the like stored in the partial area of the first storage unit 402, and also initializes each unit in the computer 146 (step S201).

In order to judge which wireless base station the computer 146 is positioned in its cognizant zone, the control unit 401 performs the zone judgment process (step S202). The details of the zone judgment process have been already explained in the first embodiment.

As a result of the zone judgment, if the zone data has not been stored or there is necessary to update the zone data because the computer 146 was moved and thus has been positioned in the cognizant zone of the another wireless base station (step S203), the control unit 401 notifies the server 120 of the updated zone data via the wireless network 160, the wireless base station 114 and the network 110 (step S204). In such the notification process, in addition to the zone data, the control unit 401 notifies the sever 120 of the kind code of computer, the name of manufacturer, the name of product, the name registered in the network, the operating condition, the error condition, the held (or stored) functional information and the like.

Further, as a result of the zone judgment, if the update of zone data is not necessary (step S203), the flow advances to a step S205. In a case where the control unit 401 does not perform the various processes such as the printing process, the facsimile process, the scanning process, the electronic filing process and the like by using the image formation apparatus connected to the network, the flow returns to the step S202 to repeat the predetermined process.

On the other hand, in a case where the control unit 401 performs the various processes such as the printing process, the facsimile process, the scanning process, the electronic filing process and the like by using the image formation apparatus connected to the network (step S205), if the image formation apparatus to be used is not yet determined (step S206), in order to obtain or acquire the information concerning which apparatus among the plurality of the image formation apparatuses connected to the network has the necessary function and which apparatus is closest to the computer 146 (step S207), in case of obtaining the zone data of the equipments within the same zone (step S208), the control unit 401 asks or inquires each equipment connected to the network about the zone data (step S209). On the contrary, in case of obtaining the zone data of the equipments outside the same zone (step S208) or in a case where it was found as a result of the inquiry in the step S209 that there is no corresponding equipment within the same zone (step S210), the control unit 401 asks or inquires the server 120 about the zone data (step S211).

Then, the zone data obtained from each inquired equipment or the server 120 is stored in the first storage unit 402 and/or the second storage unit 403 (step S212). Such the zone data is the data which has been notified from each computer or each image formation apparatus to the computer 146 via the each wireless network, each wireless base station and the network 110, or the data which has been notified from each computer or each image formation apparatus to the server 120 via each wireless network, each wireless base station and the network 110.

For example, as the zone data in each column shown in FIG. 10, each computer or each image formation apparatus has stored in its storage area the cognizant zone in which such the computer or the image formation apparatus itself is positioned, e.g., the first priority zone, the second priority zone, the third priority zone, . . . Further, for example, as shown in FIG. 10, for each computer or each image formation apparatus, the server 120 has sequentially stored as the zone data the cognizant zone in which such the computer or the image formation apparatus is positioned, e.g., the first priority zone, the second priority zone, the third priority zone, . . . That is, the server 120 has stored all the zone data which are cognized or managed by the wireless base station connected by the network 110.

In accordance with the inquiry from each equipment or each wireless base station within the same zone, each computer or each image formation apparatus notifies such the equipment or the wireless base station of the stored zone data via the wireless network and/or the network 110. For example, FIGS. 17A to 17C respectively show examples of the zone data within the same zone, i.e., FIG. 17A represents the B zone, FIG. 17B represents the A zone and FIG. 17C represents the C zone. On the other hand, in accordance with the inquiry from each equipment or each wireless base station outside the same zone, the server 120 notifies such the equipment or the wireless base station of the stored zone data via each wireless base station and each wireless network. For example, FIG. 10 shows an example of the zone data within all the zones, i.e., the A, B and C zones.

As described above, if the zone data controlled or managed by the server 120 is used, the zone data of the equipment positioned within the different zone can be obtained.

In a case where the image formation apparatus to be used has been already determined (step S213), the flow advances to a step S215. In a case where the image formation apparatus to be used is selected by using the obtained zone data (step S213), the control unit 401 performs the display and selection process (step S214). The details of the display and selection process has been already explained in the first embodiment.

If the image formation apparatus to be used is determined (step S215), the control unit 401 requests the image formation apparatus to perform the various processes such as the printing process, the facsimile process, the scanning process, the electronic filing process and the like. For example, in the case where the printing process is performed by the image formation apparatus 134, the image formation command data (to be used for the image formation) is transferred to the image formation apparatus 134 via the wireless network 160, the wireless base station 114 and the wireless network 162. Then the image formation apparatus 134 to which the image formation command data has been transferred develops such the image formation command data into the bit-map image data, to perform the printing (step S216). After then, if the various processes which have been requested to the image formation apparatus terminate (step S217), the flow returns to the step S202 to repeat the predetermined process.

Subsequently, the operation of the image formation apparatus 134 will be explained hereinafter with reference to FIG. 16.

When the power of the image formation apparatus 134 is turned on, the control unit 201 initializes the flag, the control variable and the like. Further, the control unit 201 executes the control program such as the operating system or the like stored in the partial area of the first storage unit 202, and also initializes each unit in the image formation apparatus 134 (step S221).

In order to judge which wireless base station the image formation apparatus 134 is positioned in its cognizant zone, the control unit 201 performs the zone judgment process (step S222). The details of the zone judgment process have been explained as above.

As a result of the zone judgment, if the zone data has not been stored or there is necessary to update the zone data because, e.g., the image formation apparatus 134 was moved and thus has been positioned in the cognizant zone of the another wireless base station (step S223), the control unit 201 notifies the server 120 of the updated zone data via the wireless network 162, the wireless base station 114 and the network 110 (step S224). In such the notification process, in addition to the zone data, the control unit 201 notifies the server 120 of the kind code of image formation apparatus, the name of manufacturer, the name of product, the name registered in the network, the operating condition, the error condition, the held (or stored) functional information and the like. Further, as a result of the zone judgment, if the update of zone data is not necessary (step S223), the flow advances to a step S225.

If the zone data is requested from the another computer or the image formation apparatus (step S225), the control unit 201 notifies the another computer or the image formation apparatus which requested the zone data, of the zone data via the wireless network 162, the wireless base station 114 and/or the network 110 (step S226).

If the zone data is not requested from the another computer or the image formation apparatus (step S225), the flow advances to a step S227.

In the case where the various processes such as the printing process, the facsimile process, the scanning process, the electronic filing process and the like have been requested from the computer or the another image formation apparatus each connected to the network (step S227), the control unit 201 performs such the processes (step S228). For example, if the printing process was requested by the computer 146, the image formation command data (to be used for the image formation) which has been transferred via the wireless network 160, the wireless base station 114 and the wireless network 162 is developed into the bit-map image data and thus the printing is performed.

When the requested various processes terminate (step S229), the flow returns to the step S222 to repeat the predetermined process.

(Fourth Embodiment)

Subsequently, the fourth embodiment of the present invention will be explained hereinafter.

In the above-described first to third embodiments, the computer 146 generates a job, and the image formation apparatus 134 executes such the job. On the other hand, in the present embodiment, the image formation apparatus 130 generates a job, and the image formation apparatus 134 executes such the job.

The structure of the image process system in the fourth embodiment is substantially the same as that shown in FIGS. 1 to 4. Therefore, the detailed explanation thereof is omitted in the fourth embodiment.

Hereinafter, operations of the present embodiment will be explained. In this case, the zone judgment process in the steps S202 and S222 and the display and selection process in the step S214 are substantially the same as those in the first embodiment shown in FIGS. 6 to 8, whereby the detailed explanation thereof is omitted in the fourth embodiment. Further, the flow charts shown in FIGS. 14 to 16 which have been used for the explanation of the third embodiment are again used in the fourth embodiment. That is, FIGS. 14 and 15 are the flow charts showing the main routine of the image formation apparatus 130 according to the present embodiment.

Initially, the operation of the image formation apparatus 130 (on a job generation side) will be explained hereinafter with reference to FIGS. 14 and 15.

When the power of the image formation apparatus 130 is turned on, the control unit 201 initializes the flag, the control variable and the like. Further, the control unit 201 executes the control program such as the operating system or the like stored in the partial area of the first storage unit 202, and also initializes each unit in the image formation apparatus 130 (step S201).

In order to judge which wireless base station the image formation apparatus 130 is positioned in its cognizant zone, the control unit 201 performs the zone judgment process (step S202). The details of such the zone judgment process have been already explained in the first embodiment.

As a result of the zone judgment, if the zone data has not been stored or there is necessary to update the zone data because, e.g., the image formation apparatus 130 was moved and thus has been positioned in the cognizant zone of the another wireless base station (step S203), the control unit 201 notifies the server 120 of the updated zone data via the wireless network 158, the wireless base station 114 and the network 110 (step S204). In such the notification process, in addition to the zone data, the control unit 201 notifies the server 120 of the kind code of image formation apparatus, the name of manufacturer, the name of product, the name registered in the network, the operating condition, the error condition, the held (or stored) functional information and the like.

On the other hand, as a result of the zone judgment, if the update of zone data is not necessary (step S203), the flow advances to the step S205. In the case where the control unit 201 does not perform the various processes such as the printing process, the facsimile process, the scanning process, the electronic filing process and the like by using the another image formation apparatus connected to the network, the flow returns to the step S202 to repeat the predetermined process.

On the other hand, in the case where the control unit 201 performs the various processes such as the printing process, the facsimile process, the scanning process, the electronic filing process and the like by using the another image formation apparatus connected to the network (step S205), if the another image formation apparatus to be used is not yet determined (step S206), in order to obtain or acquire the information concerning which apparatus among the plurality of the another image formation apparatuses connected to the network has the necessary function and which apparatus is closest to the image formation apparatus 130 (step S207), in case of obtaining the zone data of the equipments within the same zone (step S208), the control unit 201 asks or inquires each equipment connected to the network about the zone data (step S209). On the contrary, in case of obtaining the zone data of the equipments outside the same zone (step S208) or in a case where it was found as a result of the inquiry in the step S209 that there is no corresponding equipment within the same zone (step S210), the control unit 201 asks or inquires the server 120 about the zone data (step S211).

Then, the zone data obtained from each inquired equipment or the server 120 is stored in the first storage unit 202 and/or the second storage unit 203 (step S212). Such the zone data is the data which has been notified from each computer or each image formation apparatus to the image formation apparatus 130 via each wireless network, each wireless base station and the network 110, or the data which has been notified from each computer or each image formation apparatus to the server 120 via each wireless network, each wireless base station and the network 110.

For example, as the zone data in each column shown in FIG. 10, each computer or each image formation apparatus has stored in its storage area the cognizant zone in which such the computer or the image formation apparatus itself is positioned, e.g., the first priority zone, the second priority zone, the third priority zone, . . . Further, for example, as shown in FIG. 10, for each computer or each image formation apparatus, the server 120 has sequentially stored as the zone data the cognizant zone in which such the computer or the image formation apparatus is positioned, e.g., the first priority zone, the second priority zone, the third priority zone, . . . That is, the server 120 has stored all the zone data which are cognized or managed by the wireless base station connected by the network 110.

In accordance with the inquiry from each equipment or each wireless base station within the same zone, each computer or each image formation apparatus notifies such the equipment or the wireless base station of the stored zone data via the wireless network and/or the network 110. For example, FIGS. 17A to 17C respectively show the examples of the zone data within the same zone, i.e., FIG. 17A represents the B zone, FIG. 17B represents the A zone and FIG. 17C represents the C zone.

On the other hand, in accordance with the inquiry from each equipment or each wireless base station outside the same zone, the server 120 notifies such the equipment or the wireless base station of the stored zone data via the network 110, each wireless base station and each wireless network. For example, FIG. 10 shows the example of the zone data within all the zones connected to the network, i.e., the A, B and C zones. Therefore, by using the zone data controlled or managed by the server 120, the zone data of the equipment positioned within the different zone can be obtained.

In the case where the another image formation apparatus to be used has been already determined (step S213), the flow advances to the step S215. In the case where the another image formation apparatus to be used is selected by using the obtained zone data (step S213), the control unit 201 performs the display and selection process (step S214). The details of such the display and selection process has been already explained in the first embodiment.

If the another image formation apparatus to be used is determined (step S215), the control unit 201 requests such the another image formation apparatus to perform the various processes such as the printing process, the facsimile process, the scanning process, the electronic filing process and the like. For example, in the case where the printing process is performed by the image formation apparatus 134, the image formation apparatus 130 transfers the image formation command data (to be used for the image formation) to the image formation apparatus 134 via the wireless network 160, the wireless base station 114 and the wireless network 162. Then, the image formation apparatus 134 to which the image formation command data has been transferred develops such the image formation command data into the bit-map image data, to perform the printing (step S216). After then, if the various processes which have been requested to the image formation apparatus terminate (step S217), the flow returns to the step S202 to repeat the predetermined process.

Subsequently, the operation of the image formation apparatus 134 (on a job execution side) will be explained hereinafter with reference to FIG. 16.

When the power of the image formation apparatus 134 is turned on, the control unit 201 initializes the flag, the control variable and the like. Further, the control unit 201 executes the control program such as the operating system or the like stored in the partial area of the first storage unit 202, and also initializes each unit in the image formation apparatus 134 (step S221).

In order to judge which wireless base station the image formation apparatus 134 is positioned in its cognizant zone, the control unit 201 performs the zone judgment process (step S222). The details of such the zone judgment process have been explained as above. As a result of the zone judgment, if the zone data has not been stored or there is necessary to update the zone data because, e.g., the image formation apparatus 134 was moved and thus has been positioned in the cognizant zone of the another wireless base station (step S223), the control unit 201 notifies the server 120 of the updated zone data via the wireless network 162, the wireless base station 114 and the network 110 (step S224). In such the notification process, in addition to the zone data, the control unit 201 notifies the server 120 of the kind code of image formation apparatus, the name of manufacturer, the name of product, the name registered in the network, the operating condition, the error condition, the held (or stored) functional information and the like.

Further, as a result of the zone judgment, if the update of zone data is not necessary (step S223), the flow advances to the step S225. If the zone data is requested from the another computer or the image formation apparatus (step S225), the control unit 201 notifies the another computer or the image formation apparatus which requested the zone data, of the zone data via the wireless network 162, the wireless base station 114 and/or the network 110 (step S226).

If the zone data is not requested from the another computer or the image formation apparatus (step S225), the flow advances to the step S227. Then, in the case where the various processes such as the printing process, the facsimile process, the scanning process, the electronic filing process and the like have been requested from the computer or the another image formation apparatus each connected to the network (step S227), the control unit 201 performs such the processes (step S228).

For example, if the printing process was requested by the image formation apparatus 130, the image formation command data (to be used for the image formation) which has been transferred via the wireless network 160, the wireless base station 114 and the wireless network 162 is developed into the bit-map image data and thus the printing is performed. After then, when the requested various processes terminate (step S229), the flow returns to the step S222 to repeat the predetermined process.

Figure 18:
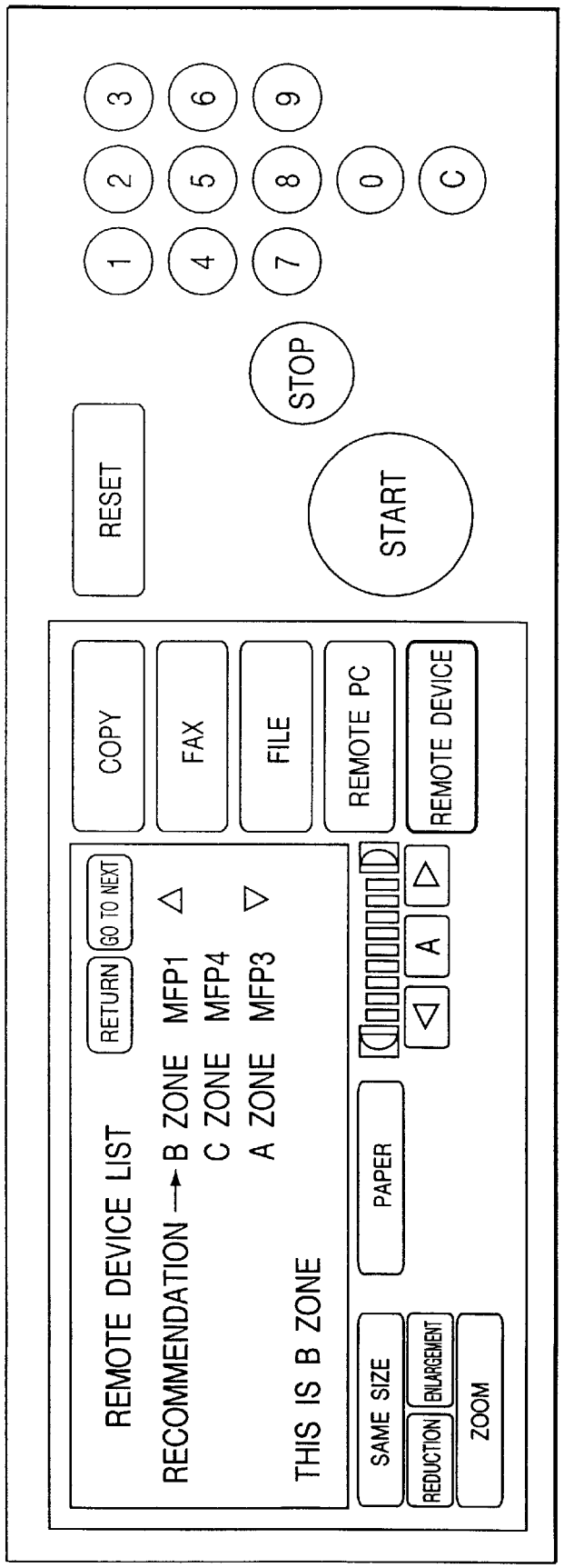
FIG. 18 is a view showing an example of display on a console unit of the image formation apparatus.
Figure 19:
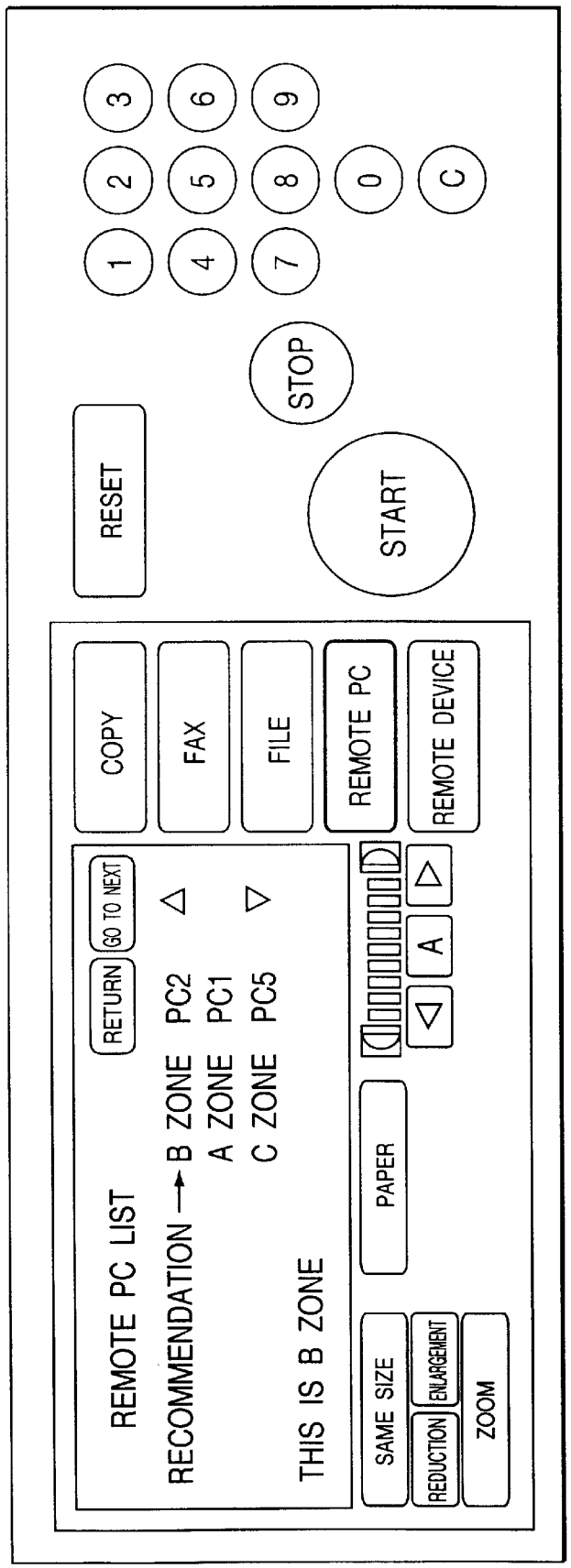
FIG. 19 is a view showing an example of display on the console unit of the image formation apparatus.
Figure 20:
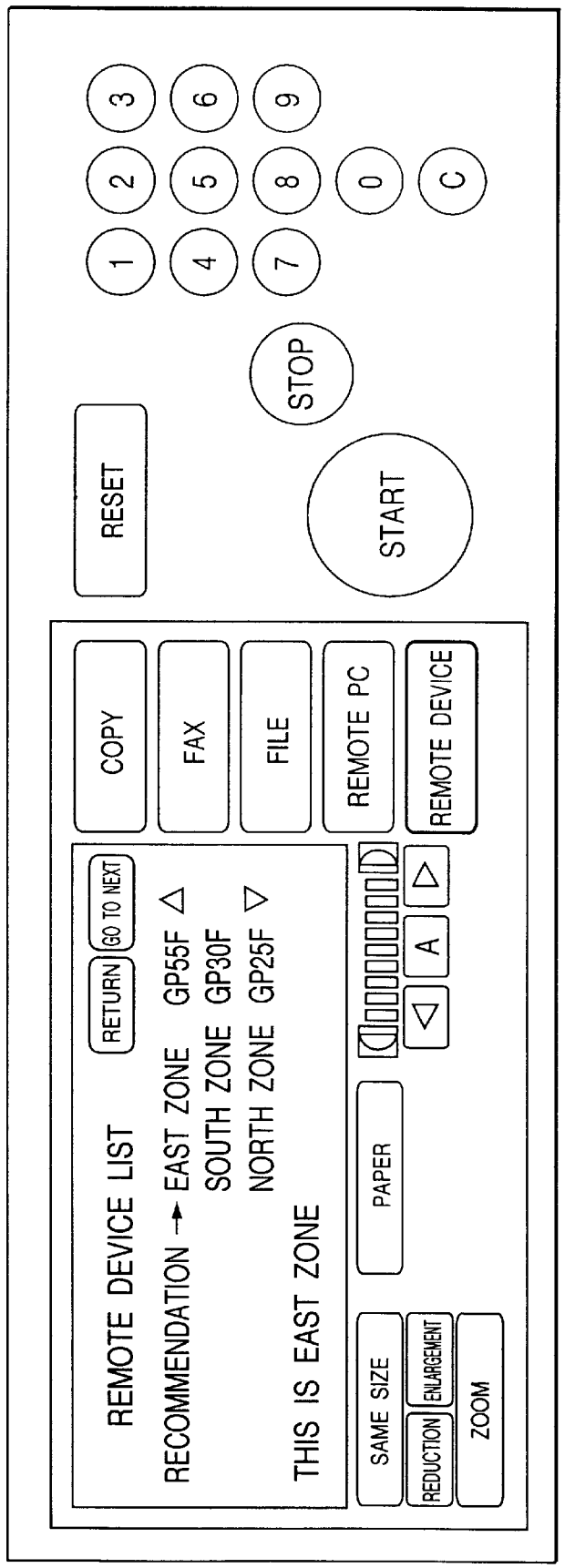
FIG. 20 is a view showing an example of display on the console unit of the image formation apparatus.

FIGS. 18 to 20 respectively show examples of displayed contents on the console unit of the image formation apparatus. FIG. 18 shows the example in the case where the another image formation apparatuses on the connected destinations are displayed in order of priority, as explained in the display and selection routine shown in FIG. 7.

According to such the example of display, each wireless base station is registered in the name of A, B or C zone, and also each image formation apparatus is registered in the name of, e.g., "MFP 1" or the like. The another image formation apparatuses positioned in these zones are respectively displayed on the console unit of this image formation apparatus by using the zone name and the apparatus name, in order of priority beginning from the closest one.

In addition, the zone in which this image formation apparatus itself is positioned is also displayed on the console unit, whereby the positions of the another image formation apparatuses can be easily grasped or recognized. FIG. 19 shows the example in the case where the computers on the connected destinations are displayed in order of priority, as explained in the display and selection routine shown in FIG. 7. According to such the example of display, each wireless base station is registered in the name of A, B or C zone, and also each computer is registered in the name of, e.g., "PC 1" or the like. The another computers positioned in these zones are respectively displayed on the console unit of this image formation apparatus by using the zone name and the computer name, in order of priority beginning from the closest one. In addition, the zone in which this image formation apparatus itself is positioned is also displayed on the console unit, whereby the positions of the another computers can be easily grasped or recognized.

FIG. 20 shows the example in the case where the another image formation apparatuses on the connected destinations are displayed in order of priority, as explained in the display and selection routine shown in FIG. 7.

According to such the example of display, each wireless base station is registered in the name of North, East or South zone which can be easily judged or grasped on the basis of locations of the buildings. Further, by using the name of product which is notified by each image formation apparatus in accordance with the inquiry from the another equipments or the server, the another image formation apparatuses positioned in the above zones are respectively displayed on the console unit of this image formation apparatus by using the zone name and the name of product, in order of priority beginning from the closest one. Generally, such the name of product is widely described or marked in front of the image formation apparatus or the like as a matter of manufacture's convenience, and thus tends to be easily discriminating. For this reason, everybody can intuitively know where the closest equipment intended to be used is positioned and what kind of equipment is the intended one, thereby resulting in convenience. In addition, the zone in which this image formation apparatus itself is positioned is also displayed on the console unit, whereby the positions of the another image formation apparatuses can be easily grasped or recognized.

In the foregoing embodiments, the system structure having the single wireless network has been explained. However, of course, the present invention can have the system structure in which the plurality of wireless networks are connected to others via the wire network.

Further, of course, the present invention can have the system structure in which the above networks are connected to others via the single or the plurality of public lines. Furthermore, in the foregoing embodiments, there has been explained that the single server is connected to the network. However, the present invention can have the structure in which the single or the plurality of servers are connected to each network.

Furthermore, in the foregoing embodiments, as the method for detecting the position of the computer or the image formation apparatus connected to the network, there has been explained that the corresponding zone is detected by the zone detection means provided in each computer or each image formation apparatus. However, such the position can be detected in an another method, e.g., using a GPS (global positioning system) or the like.

As described above, according to each embodiment of the present invention, on the display unit or the like provided in the computer or the image formation apparatus which is the equipment on the side of requesting the process, from among the plurality of image formation apparatuses on the side to which the process is requested, the image formation apparatuses which are close to the equipment on the process-requesting side can be detected, displayed and selected. Therefore, in the case where the portable computer or the movable image formation apparatus is connected to the wireless network and used, the operator can perform the printing output by using the image formation apparatus which is closest to him, thereby improving the convenience and security.

(Other Embodiments)

The present invention can be applied to a system constructed by a plurality of equipments (e.g., host computer, interface equipment, reader, printer and the like) or can be also applied to an apparatus comprising a single equipment (e.g., copy machine, facsimile machine).

The invention employed by a method whereby program codes of a software to realize the functions of the foregoing embodiments are supplied to a computer in an apparatus or a system connected to various devices so as to make the devices operative in order to realize the functions of the foregoing embodiments and the various devices are operated in accordance with the programs stored in the computer (CPU or MPU) of the system or apparatus in also included in the scope of the present invention.

In such a case, the program codes themselves of the software realize the functions of the foregoing embodiments and the program codes themselves and means for supplying the program codes to the computer, e.g., a memory medium in which the program codes have been stored construct the present invention.

As such a memory medium to store the program codes, e.g., it is possible to use a floppy disk, a hard disk, an optical disk, an optomagnetic disk, a CD-ROM, a magnetic tape, a nonvolatile memory card, a ROM or the like can be used.

It will be obviously understood that the program codes are included in the embodiments of the present invention even in not only a case where the functions of the foregoing embodiments are realized by executing the supplied program codes by the computer but also a case where the functions of the foregoing embodiments are realized in cooperation with the OS (operating system) by which the program codes operate in the computer or another application software or the like.

Further, it will be also obviously understood that the present invention also incorporates a case where the supplied program codes are stored into a memory provided for a function expansion board of a computer or a function expansion unit connected to a computer and, after that, a CPU or the like provided for the function expansion board or the function expansion unit executes a part or all of the actual processes on the basis of instructions of the program codes, and the functions of the foregoing embodiments are realized by the processes.

Although the present invention has been described above with respect to the preferred embodiments, the present invention is not limited to the foregoing embodiments but many modifications and variations are possible with the spirit and scope of the appended claims.

What is claimed is:

1. A data process apparatus in a network system capable of connecting a plurality of terminals, said apparatus comprising:

judgment means for judging a setting position of said data process apparatus within the network system;

request means for requesting a data process;

sorting means for sorting the plurality of terminals based on the setting position judged by said judgment means:

display means for causing a display unit to display information representing the plurality of terminals, sorted by said sorting means, within the network system which terminal should perform the data process requested by said request means; and indication means for indicating the terminal corresponding to the information displayed on the display unit by said display means, to perform the data process.

2. An apparatus according to claim 1, wherein said display means causes the display unit to display the information representing the terminal within the network for each of a plurality of setting areas, on the basis of the setting position judged by said judgment means.

3. An apparatus according to claim 1, wherein said display means causes the display unit to display the information representing the plurality of terminals within the network system in priority order, on the basis of the setting position judged by said judgment means.

4. An apparatus according to claim 1, wherein said judgment means judges the setting position by means of wireless communication.

5. A data process apparatus in a network system capable of connecting a plurality of terminals, said apparatus comprising:

request means for requesting a data process;

judgment means for judging ability necessary for the data process requested by said request means;

sorting means for sorting the plurality of terminals based on respective setting positions;

display means for causing a display unit to display information representing the plurality of terminals sorted by said sorting means and having the ability judged by said judgment means within the network system; and indication means for indicating the terminal corresponding to the information displayed by said display means, to perform the data process.

6. An apparatus according to claim 5, wherein said display means causes the display unit to display the information representing the terminal within the network system in priority order, on the basis of the ability judged by said judgment means.

7. An apparatus according to claim 5, further comprising discrimination means for discriminating a setting position of said data process apparatus, and wherein said display means causes the display unit to display the information representing the terminal from among the terminals having the ability judged by said judgment means, as it correlates the terminal with the setting position discriminated by said discrimination means.

8. A computer readable program, stored in a storage means, for controlling a data process apparatus in a network system capable of connecting a plurality of terminals, said program comprising:

a judgment step of judging a setting position of the data process apparatus within the network system;

a request step of requesting a data process;

a sorting step for sorting the plurality of terminals based on the setting position judged in the judgment step;

a display step of causing a display unit to display information representing the plurality of terminals, sorted by the sorting step within the network system which terminal should perform the data process requested in said request step; and an indication step of indicating the terminal corresponding the information displayed on the display unit in said display step, to perform the data process.

9. A computer readable program, stored in storage medium, for controlling a data process apparatus in a network system capable of connecting a plurality of terminals, said program comprising:

a request step of requesting a data process;

a judgment step of judging ability necessary for the data process requested in said request step;

a sorting step for sorting the plurality of terminals based on respective setting positions;

a display step of causing a display unit to display information representing the plurality of terminals sorted by the sorting step and having the ability judged in said judgment step within the network system; and an indication step of indicating the terminal corresponding to the information displayed in said display step, to perform the data process.

10. A data processing apparatus comprising:

storing means for storing a setting position of said data processing apparatus;

detecting means for detecting a change of the setting position of said data processing apparatus; and rewriting means for rewriting the setting position of said data processing apparatus stored by said storing means, in a case where said detecting means detects that the setting position was changed.

11. An apparatus according to claim 10, wherein said detecting means detects the change of the setting position by means of wireless communication.

12. An apparatus according to claim 10, wherein said data processing apparatus is arranged in one of a plurality of areas, and said detecting means detects that the setting position of said data processing apparatus is changed from one area to another area.

13. An apparatus according to claim 12, wherein said detecting means determines the present setting position of said data processing apparatus, and detects the change on the basis of the present setting position and the setting position of said data processing apparatus stored in said storing means.

14. A data process method in a network system capable of connecting a plurality of terminals, said method comprising:

a judgment step of judging a setting position of a data process apparatus within the network system;

a request step of requesting a data process;

a sorting step of sorting the plurality of terminals based on the setting position judged in said judgment step;

a display step of causing a display unit to display information representing the plurality of terminals, sorted in said sorting step, within the network system which terminal should perform the data process requested in said request step; and an indication step of indicating the terminal corresponding to the information displayed on the display unit in said display step, to perform the data process.

15. A data process method in a network system capable of connecting a plurality of terminals, said method comprising:

a request step of requesting a data process;

a judgment step of judging ability necessary for the data process request in said request step;

a sorting step of sorting the plurality of terminals based on respective setting positions;

a display step of causing a display unit to display information representing the plurality of terminals sorted in said sorting step and having the ability judged in said judgment step within the network system; and an indication step of indicating the terminal corresponding to the information displayed in said display step, to perform the data process.

16. A data processing method comprising:

a storing step of storing a setting position of a data processing apparatus;

a detecting step of detecting a change of the setting position of the data processing apparatus; and a rewriting step of rewriting the setting position of the data processing apparatus stored in said storing step, in a case where said detecting step detects that the setting position was changed.

17. A computer readable program for executing a data processing method comprising:

a storing step for storing a setting position of a data processing apparatus;

a detecting step of detecting a change of the setting position of the data processing apparatus; and a rewriting step of rewriting the setting position of the data processing apparatus stored in said storing step, in a case where said detecting step detects that the setting position was changed.

* * * * *